(12) United States Patent
Dao et al.

(10) Patent No.: US 12,652,172 B2
(45) Date of Patent: Jun. 9, 2026

(54) SEPARATE ENCRYPTION OF DIFFERENT PARAMETERS OF AN ACCESS TOKEN

(71) Applicant: CITIBANK, N.A., New York, NY (US)

(72) Inventors: Tuan Quoc Dao, Irving, TX (US); Mayank Dinesh Shah, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/668,100

(22) Filed: May 17, 2024

(65) Prior Publication Data

US 2025/0358115 A1 Nov. 20, 2025

Related U.S. Application Data

(63) Continuation-in-part of application No. 18/539,904, filed on Dec. 14, 2023, now abandoned, which is a continuation-in-part of application No. 18/515,835, filed on Nov. 21, 2023, now abandoned.

(51) Int. Cl.
*H04L 9/32* (2006.01)
*H04L 9/40* (2022.01)

(52) U.S. Cl.
CPC ........ *H04L 9/3213* (2013.01); *H04L 63/0435* (2013.01)

(58) Field of Classification Search
CPC .......................... H04L 9/3213; H04L 63/0435
USPC .......................................................... 726/9
See application file for complete search history.

(56) References Cited

U.S. PATENT DOCUMENTS

| | | | | |
|---|---|---|---|---|
| 6,212,635 B1* | 4/2001 | Reardon | ................. | G06F 21/82 |
| | | | | 726/19 |
| 11,966,951 B2 | 4/2024 | Schobeiri et al. | | |
| 2004/0059913 A1* | 3/2004 | de Jong | .............. | H04W 12/068 |
| | | | | 713/165 |
| 2004/0059939 A1* | 3/2004 | de Jong | ................ | H04L 9/3213 |
| | | | | 726/28 |
| 2004/0167826 A1 | 8/2004 | Kobayashi et al. | | |

(Continued)

OTHER PUBLICATIONS

Notice of Allowance issued Aug. 14, 2024, in related U.S. Appl. No. 18/661,549 (10 pages).

(Continued)

*Primary Examiner* — Catherine Thiaw
*Assistant Examiner* — Nega Woldemariam
(74) *Attorney, Agent, or Firm* — Davis Wright Tremaine LLP

(57) ABSTRACT

The technology is directed to a system for separately encrypting parameters of an access token. The system may receive a request for an access token and may determine computing devices for receiving the access token and sets of parameters that each computing device is to access. The system may identify encryption keys associated with the computing devices. Each computing device may store a corresponding decryption key for decryption a corresponding set of parameters. The system may encrypt each set of parameters using a corresponding encryption key to generate encrypted sets of parameters. The system may generate the access token by adding the encrypted sets of parameters to the access token. The system may then transmit the access token to a requesting device.

18 Claims, 4 Drawing Sheets

(56)       References Cited

U.S. PATENT DOCUMENTS

| | | | |
|---|---|---|---|
| 2007/0130463 A1 * | 6/2007 | Law ........................ | G06F 21/34 |
| | | | 713/168 |
| 2017/0017957 A1 * | 1/2017 | Radu ................. | G06Q 20/4012 |
| 2019/0199527 A1 | 6/2019 | Kuris | |
| 2019/0230070 A1 * | 7/2019 | Isaacson ............. | G06Q 20/384 |
| 2020/0250287 A1 * | 8/2020 | Singh ................... | H04L 9/3231 |
| 2020/0311675 A1 | 10/2020 | Sankaran | |
| 2021/0029106 A1 * | 1/2021 | Breitenbach ....... | G05B 19/0426 |
| 2021/0377260 A1 | 12/2021 | Phillips et al. | |
| 2022/0029820 A1 * | 1/2022 | Mozano ................ | H04L 9/0891 |
| 2022/0078238 A1 * | 3/2022 | Nixon .................. | G06F 9/4401 |
| 2022/0198036 A1 | 6/2022 | Bayat | |
| 2023/0024639 A1 * | 1/2023 | Cucu .................... | H04L 9/0825 |
| 2023/0214792 A1 * | 7/2023 | Lee ........................ | G06Q 20/02 |
| | | | 705/75 |
| 2023/0224293 A1 * | 7/2023 | Rohlwing ........... | H04L 63/0823 |
| | | | 713/156 |
| 2024/0113881 A1 * | 4/2024 | Johar ................... | H04L 9/0825 |
| 2024/0195623 A1 * | 6/2024 | Osborn ................. | H04L 9/3247 |

OTHER PUBLICATIONS

European Patent Office Extended Search Report for Application No. 25175952.8 dated Aug. 6, 2025, 9 pages.

* cited by examiner

100

200

SEPARATE ENCRYPTION OF DIFFERENT PARAMETERS OF AN ACCESS TOKEN

This application is a continuation-in-part of U.S. patent application Ser. No. 18/539,904 filed Dec. 14, 2023, which is a continuation-in-part of U.S. patent application Ser. No. 18/515,835 filed Nov. 21, 2023. The content of the foregoing application is incorporated herein in its entirety by reference.

BACKGROUND

Many different systems provide digital content to user computing devices. For example, digital content ecosystems provide opportunities for third parties to display digital content to users on user computing devices. The content is provided based on data related to the user. In many situations, the user data is sensitive data or other data that the user may not wish to be shared with third parties or stored for future use. Conventional systems do not provide any process to provide user data to third parties that wish to provide digital content without allowing the third parties or a publisher of the digital content to have access to sensitive user data.

SUMMARY

Use of computing devices (e.g., smartphone, electronic tablets, etc.) has skyrocketed in the last decade. People use computing devices for a variety of operations, including scheduling, communications, and others. Accordingly, keeping those operations safe has become a vital task for all parties involved. Encryption is a key part of keeping operations safe. However, if multiple parties are involved, encryption becomes difficult as multiple parties may need access to the encrypted data which may require sharing the same decryption key with multiple parties. This mechanism may then be prone to key loss as more systems and people have access to the decryption key. Accordingly, it may be advantageous to provide an access token that includes data encrypted with different encryption keys so that different devices are able to decrypt different portions of the access tokens with no keys being shared.

In some embodiments, the system may receive a request for an access token. The request may include a token type associated with the access token and request metadata associated with the request. For example, the request may be for an object token, a delivery token, or another suitable token. The request may be received from a user device or another suitable device. The request metadata may include identifiers of various servers that may need the access token. In some embodiments, the access token may be a single-use token that may not be available after one use and/or certain amount of time.

The system may then determine, (e.g., based on the token type of the access token or based on other data) a plurality of computing devices for receiving the access token. In addition, the system may determine a plurality of sets of parameters that each computing device of the plurality of computing devices is to access. For example, a delivery server may need addressing data, while an object server may need access to object data. Accordingly, the system may identify computing devices that may need various pieces of data.

The system may then identify a plurality of encryption keys associated with the plurality of computing devices. For example, each computing device may be associated with an encryption key for encrypting data and with a decryption key for decrypting data. The encryption key may be available. The system may retrieve the encryption keys from a storage location (e.g., a database).

When the system retrieves the appropriate encryption keys, the system may encrypt different data portions with different encryption keys so they can be decrypted by different devices. In particular, the system may encrypt each set of parameters of the plurality of sets of parameters using a corresponding encryption key of the plurality of encryption keys to generate an encrypted plurality of sets of parameters. Furthermore, each computing device of the plurality of computing devices may store a corresponding decryption key for decryption a corresponding set of parameters. For example, the system may encrypt delivery data using an encryption key associated with the delivery server. So that the delivery server is able to decrypt the data using the decryption key stored on the delivery server.

The system may then combine the different encrypted data into an access token, which may be a single-use token. In particular, the system may generate the access token by adding the encrypted plurality of sets of parameters to the access token. For example, the access token may be a data structure with various fields. The system may add the encrypted data into different fields within the data structure or label the data with a particular identifier for a computing device. The system may then transmit the access token to a requesting device. In some embodiments, the system may transmit the access token to other devices (e.g., the computing devices that are enabled to decrypt different data within the access token.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which.

Figure 1:
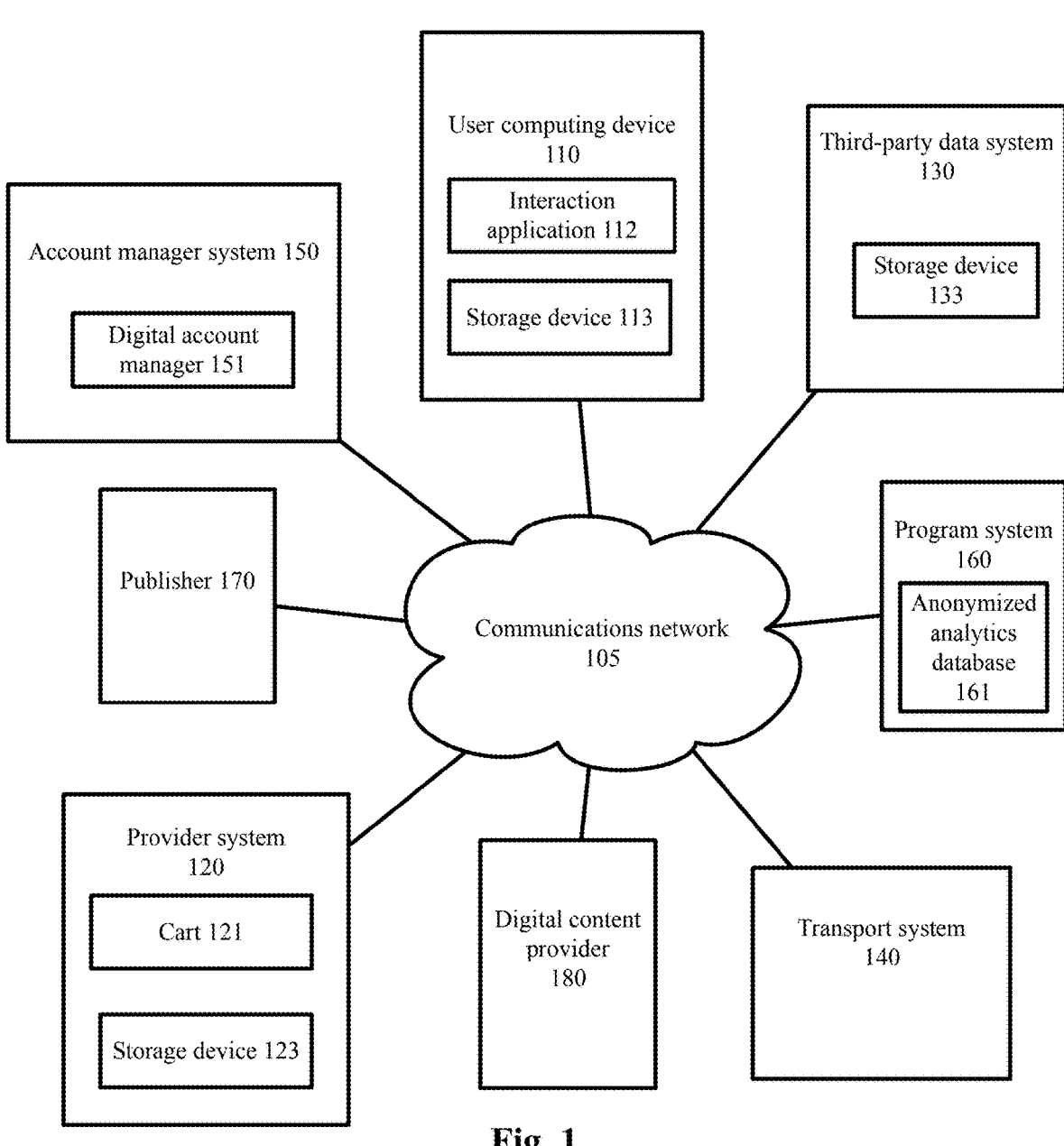
FIG. 1 is a block diagram depicting a portion of a communications and processing architecture of a typical system to provide obscured data sets.

The figures herein are for illustrative purposes only and are not necessarily drawn to scale. These and other aspects, objects, features, and advantages of the example embodiments will become apparent to those having ordinary skill in the art upon consideration of the following detailed description of example embodiments.

DETAILED DESCRIPTION

In some embodiments, the system may use an encryption and/or encoding mechanism to provide access to different portions of a token to different computing devices. The system may receive a request for an access token. The access token being requested may be a single-use token such that the token may expire when used once. For example, each system that receive the access token may be configured to use the token and then mark the token as used by that system. The access token may be marked by adding a flag to the access token or may be marked within a database entry associated with that access token. In some embodiments, the request may include a token type associated with the access token and request metadata associated with the request. The token type may indicate the purpose of the access token. For example, the access token may be associated with anonymous object delivery such that the delivery provider does not have access to any user data except for a delivery address needed to deliver the object. Other access token examples are described further within this disclosure where the access token may be referred to as an obscured data set.

In some embodiments, the system may receive a request for an access token. The token may include data strings that have undergone encryption or encoding processes to protect sensitive information during transmission or storage. The token may be encrypted such that it may only be deciphered with the appropriate decryption key. In some embodiments, the access token may be a single-use token. For example, a single-use token may expire after a single use. Single-use tokens may be temporary authentication codes or identifiers used in security protocols to enhance protection against unauthorized access or fraudulent activities. Once utilized, they may become invalid, mitigating the risk of unauthorized access even if intercepted. Single-use tokens may add an extra layer of security to digital interactions to safeguard sensitive data. The request may include a token type associated with the access token. For example, the token type may relate to the function of the token or the systems or computing devices that will receive the token.

In some embodiments, the request may include request metadata associated with the request. The request metadata may include data that indicates various providers that will need to decrypt or decode the token. In some embodiments, a provider may include a service provider, online store, product provider, counterparty, or any other entity. In an example, the provider may be an online retailer that receives orders from a user and uses a distribution system to deliver goods to an address of the user. For example, the metadata may include provider identifiers, which may then be used to identify the associated servers. In some embodiments, the providers may be identified based on the access token types. In some embodiments, the providers may be identified by a combination of the access token type and provider identifiers.

The system may then determine computing devices for receiving the access token. In some embodiments, a computing device type may be associated with a provider or a provider identifier. The system may determine the computing devices based on the type of token. In some embodiments, to determine the computing devices, the system may retrieve, from the request, the token type and perform a lookup (e.g., within a database) for provider identifiers and/or provider types required for the particular token type. In some embodiments, the system may retrieve token type metadata associated with the token type. For example, the token type metadata may indicate computing device types for the request. The system may then identify, within the request, the computing devices based on corresponding computing device types. As an example, based on a token type from the request, the system may determine that the computing devices include a distribution system, an authentication system, or other systems.

In some embodiments, the system may determine sets of parameters that each computing device is to access. In some embodiments, sets of parameters may include fields or types of fields within a data structure included in the access token. As an example, a distribution system may access a delivery address and preferred delivery hours whereas an authentication system may access a name and a date of birth. In some embodiments, the system may retrieve, from the request, the token type and perform a lookup (e.g., within a database) for sets of parameters associated with the token type.

The system may identify encryption keys or encoding keys associated with the computing devices. An encryption or encoding key may be a unique function or algorithm that obscures data in such a way that the data may only be accessed using a corresponding decryption or decoding key. For example, each computing device may be associated with one or more encryption keys. Each encryption key may encrypt access tokens for a corresponding computing device. In some embodiments, identifying the encryption key may involve performing a lookup within a database for an encryption key corresponding to each computing device. In some embodiments, the system may perform the lookup using an identifier associated with each computing device.

The system may encrypt each set of parameters using a corresponding encryption key to generate encrypted sets of parameters. In some embodiments, the system may select a first computing system and a second computing system and determine, based on computing system types of the first and second computing systems, a first set of parameters required by the first computing system and a second set of parameters required by the second computing system. For example, a first computing system (e.g., a distribution system) may require a first set of parameters including a delivery address and preferred delivery hours and a second computing system (e.g., an authentication system) may require a second set of parameters including a name and a date of birth.

The token may be encrypted in such a way that only the corresponding computing device may decrypt a given parameter of the token. The system may use multiple encryption keys to generate the access token. In some embodiments, each computing device may store a corresponding decryption key for decryption a corresponding set of parameters. For example, the system may encrypt a first set of parameters using a first encryption key such that a first computing device can decrypt the first set of parameters using a first corresponding decryption key. The system may encrypt a second set of parameters using a second encryption key such that a second computing device can decrypt the second set of parameters using a second corresponding decryption key. As an example, the first set of parameters may include a delivery address and preferred delivery hours, and the second set of parameters may include a name and a date of birth. The system may use a first encryption key associated with a distribution system to encrypt the first set of parameters such that the distribution system can decrypt the first set of parameters. In some embodiments, the authentication system will be unable to decrypt the first set of parameters. The system may use a second encryption key associated with an authentication system to encrypt the second set of parameters such that the authentication system can decrypt the second set of parameters. In some embodiments, the distribution system will be unable to decrypt the second set of parameters.

Encrypting the sets of parameters may involve modifying a data structure associated with the token. For example, the system may generate a data structure including multiple fields. The system may modify a first field or fields to include a first set of parameters (e.g., an address and preferred delivery hours) and a second field or fields to include a second set of parameters (e.g., name and date of birth). The system may then use a first encryption key to encrypt the first set of parameters and a second key to encrypt the second set of parameters. In some embodiments, the first encryption key may include a first encryption function and the second encryption key may include a second encryption function. In some embodiments, the system may retrieve the encryption functions by performing a lookup, within a database, for the encryption functions. The system may input, into the first encryption function, the first encryption key and a portion of the data structure including the first field or fields. The system may input, into the second encryption function, the second encryption key and a portion of the data structure including the second field or fields. The system may then receive, from the encryption functions, encrypted sets of parameters for the token.

The system may generate the access token by adding the encrypted sets of parameters to the access token. For example, the system may modify the data structure to replace the original sets of parameters with the encrypted sets of parameters. In some embodiments, the system may generate a new data structure including the encrypted sets of parameters. In some embodiments, the system may generate token metadata for each computing device. For example, the token metadata may include indications within the access token for each computing device. The system may then store the token metadata in a data structure within the access token. Each computing device of the plurality of computing devices may access the data structure to determine a corresponding portion of the access token to decrypt.

In some embodiments, the system may determine that the request is associated with a first token type. Based on determining that the request is associated with the first token type, the system may retrieve user parameters and object parameters. For example, user parameters may include a name, a date of birth, and an address. Object parameters may relate to an object associated with the token. For example, the object may be part of a transaction that triggered the request for the token. Object parameters may include a value, a description, and other parameters relating to the object. The system may encrypt the object parameters with a first encryption key associated with a first computing device for processing object data to generate encrypted object data and the system may encrypt the user parameters with a second encryption key associated with a second computing device for processing user data to generate encrypted user data. The system may then add the encrypted user data and the encrypted object data to the access token.

In some embodiments, the system may update or change certain parameters within an access token. For example, a delivery address may change. The system may update the token to reflect the change. The system may determine that the change relates to a first computing device (e.g., a distribution system). The system may then determine a set of parameters required for the first computing device. The system may overwrite, within the access token, token parameters within the set of parameters to reflect the update or change. In some embodiments, the system may flag the token or mark the token as overwritten.

In some embodiments, the system may generate new access tokens that are specific to each computing device. For example, the system may determine a first set of parameters required for a first computing device. The first set of parameters may include a delivery address and preferred delivery hours, and the first computing device may be associated with a distribution system. The system may overwrite, within the access token, token parameters that are not within the set of parameters to generate a new token. For example, the system may overwrite sets of parameters not required by the distribution system (e.g., a second set of parameters required by the authentication system). The system may thus generate a new token that is specific to the distribution system. The system may then transmit the new token to the first computing device.

The system may transmit the access token to a requesting device. For example, the requesting device may be a user device, a computing device, or another device. The requesting device may subsequently share the access token with other entities, but, without the corresponding decryption keys, unauthorized entities will be unable to access the parameters of the access token. Computing systems having decryption keys corresponding to the encrypted parameters will be able to access the corresponding data.

Other Embodiments

Many different systems provide digital content to user computing devices. For example, digital content ecosystems provide opportunities for third parties to display digital content to users on user computing devices. The content is provided based on data related to the user. In many situations, the user data is sensitive data or other data that the user may not wish to be shared with third parties or stored for future use. Conventional systems do not provide any process to provide user data to third parties that wish to provide digital content without allowing the third parties or a publisher of the digital content to have access to sensitive user data.

In the technology, a system is provided that allows an obscured data set to be generated and provided to another systems with certain data in the data set obscured to prevent the systems from obtaining sensitive data. The obscured data may include user identifications, user demographics, interests, interaction histories, delivery addresses, a phone number, or other sensitive data.

In one example process, a user that is conducting interactions using a digital account manager or other type of online instrument establishes an account with a third-party data system. The third-party data system receives the delivery address or other sensitive data of the user and creates a data set that obscures sensitive data. The obscured data set is generated by the third-party data system and provided to the digital account manager or any payment application that has a Know-Your-Customer ("KYC") relationship with the user.

When a user requests a delivery from a provider system, the provider system requests a delivery address from the user or from the digital account manager. Instead of provided the actual delivery address, the digital account manager provides the obscured data set. When the provider initiates a transport, such as when a purchased product is ready for transportation to the user, the provider system provides the order information and the obscured data set to the third-party data system. The third-party data system unmasks the obscured data set and associates the transportation of the product with the actual delivery address. The third-party data system provides the actual delivery address to a transport system with the order data. With the actual delivery address, the transport system may deliver the product to the delivery address. In another example, the provider system provides the obscured data set to the transport system for delivery. The transport system may request unmasking of the obscured data set from the third-party data system.

The third-party data system may request tracking data from the transport system. The third-party data system data obscures the tracking data to obscure the sensitive data and provides the tracking data set to the provider system. The tracking data set allows the provider system to see a status of the delivery without seeing the delivery address, the username, or other sensitive data.

The third-party data system will optionally apply a set of risk rules before generating or providing an obscured data set. The risk rules may be a static set of rules or a continuously updated set of rules. The risk rules may be created or implemented by a machine learning algorithm or system operating on the third-party data system. The risk rules may detect illegitimate delivery data, such as an attempt to divert a delivery to an illegitimate actor. In another example, the risk rules may detect that an abnormal number of deliveries are being transported to a single address in a location that is associated with fraud.

In another example of the process, a user computing device hosts an interaction application that recommends provider systems, initiates interactions, and communicates with an account manager system. The interaction application hosts user interaction data, such as demographic data, user interests, account data, interaction histories, or any other suitable data.

The interaction application communicates requests to an account manager system that manages interactions with provider systems, publishers, and other systems. The account manager system provides necessary data to provider systems and other systems to conduct interactions. The account manager system communicates user data to third party data systems to provide obscured data to other systems to prevent unnecessary sharing of sensitive user data.

When a user desires to initiate an interaction with a provider system or a publisher, the account manager system requests obscured data from the third party data system. The obscured data may include obscured user data ("U-data") and obscured publish data ("P-data"). The obscured data prevents any sensitive data from being provided to other system. Only the required data to perform the interaction is included in the obscured data. Further, the U-data and the P-data are not combinable to identify any sensitive data about the user. A holder of both sets of data would not be able to identify that the user associated with the U-data is the same user as the user associated with the P-data.

The user may interact with a publisher. The publisher may provide any type of digital experience to the user, such a game, a search engine, a social media experience, or any other suitable digital experience. The publisher allows digital content providers to interject content into the user experience, such as on a portion of a user interface screen, on a pop-up window, or on an overlaid window. The digital content provider desires to know details about the user to determine if the digital content provider should provide content for the user and what type of content to provide. In conventional systems, the publisher provides user details to the digital content provider such as user identification, user histories, user preferences, demographic data, and user interests. The user may choose to prevent the digital content provider from having access to some or all of this data.

The third party data system provides the P-data to the publisher to share with the digital content provider. The P-data only provides necessary data for the digital content provider to make these decisions. Any sensitive data of the user is obscured by the third party data system before communication of the P-data. In an example, the P-data may only include interests of the user such as the types of products in which the user is interested. The user may elect not to communicate interests that the user considers to be sensitive. The publisher provides the interests of the user in the P-data to the digital content provider to allow the digital content provider to determine if the user should receive digital content. The P-data may include other useful data, but not sensitive or private, such as generic data about the user location.

In certain examples, the publisher may redirect the user computing device to a provider system when a user makes an election of an object associated with the digital content. If the user elects to interact with the provider system to conduct a transaction or other interaction, the account manager system provides the U-data to the provider system. The U-data may include only the data necessary to conduct the interaction. The U-data obscures any sensitive data associated with the user. The U-data may be provided in a token or other suitable encryption format.

In another example, the interaction application may direct the user interface on the user computing device directly to a provider system to conduct an interaction. In this example, the U-data may be provided to conduct the interaction. However, while the user is interacting with the provider system, the provider system may desire to provide content to the user related to programs of the provider system. To allow the provider system to make decisions related to the programs provided to the user, the provider system desires to know the interests of the user. The account manager system may direct the third-party data system to communicate the interests of the user to the provider system, such as with the P-data. The provider system may use the interests to determine which programs to offer to the user while the user interface is interacting with the provider system.

This invention represents an advance in computer engineering and a substantial advancement over existing practices. Certain examples herein are related to interactions with provider system, such as to conduct a transaction for a product, but any other type of interactions may use the processes, systems, and methods described herein. For example, an interaction to allow a user access to a physical space or to a database or other secure digital spaces. In another example, the digital content provided to a user may be an offer, but other types of digital content may be provided, such as display of art, a list of sports scores, a request for authorization to access a location, or any other type of digital content. The technology is directed to the process of generating and providing obscured data sets and not to the interaction itself. The technology is not an economic technology, but instead is a secure interaction technology that provides an improvement to current systems by obscuring certain data sets. The technology provides data transfers using data obscuring to prevent theft or unauthorized use of private data.

Example System Architectures

Turning now to the drawings, in which like numerals represent like (but not necessarily identical) elements throughout the figures, example embodiments are described in detail.

FIG. 1 is a block diagram depicting a system 100 to provide obscured data sets. A user associated with a user computing device 110 installs an application or makes a feature selection to obtain the benefits of the techniques described herein.

As depicted in FIG. 1, the system 100 includes network computing devices/systems 110, 120, 130, 140, 150, 160, 170, and 180 that are configured to communicate with one another via one or more networks 105 or via any suitable communication technology.

Each network 105 includes a wired or wireless telecommunication means by which network devices/systems (including devices 110, 120, 130, 140, 150, 160, 170, and 180) can exchange data, such as a fiber optic cable network. For example, each network 105 can include any of those described herein such as the network 2080 described in FIG. 4 or any combination thereof or any other appropriate architecture or system that facilitates the communication of signals and data. Throughout the discussion of example embodiments, the terms "data" and "information" are used interchangeably herein to refer to text, images, audio, video, or any other form of information that can exist in a computer-based environment. The communication technology utilized by the devices/systems 110, 120, 130, 140, 150, 160, 170, and 180 may be similar networks to network 105 or an alternative communication technology.

Each network computing device/system 120, 130, 140, 150, 160, 170, and 180 includes a computing device having a communication module capable of transmitting and receiving data over the network 105 or a similar network. For example, each network device/system 120, 130, 140, and 150 can include any computing machine 2000 described herein and found in FIG. 3 or any other wired or wireless, processor-driven device. In the example embodiment depicted in FIG. 1, the network devices/systems 120, 130, 140, 150, 160, 170, and 180 are operated by provider operators, third-party data system operators, transport system operators, account manager system operators or users, program system operators, publisher operators, and/or digital content provider operators, respectively.

The user computing device 110 can use the interaction application 112, which may be, for example, an application operating on the user computing device 110, a web browser, or a stand-alone module, to view, download, upload, or otherwise access documents or web pages through a user interface via the network 105. The user computing device 110 can interact with the web servers or other computing devices connected to the network 105, including the provider system 120, the third-party data system 130, or any other component of the network 105. In another example embodiment, the user computing device 110 communicates with devices in the network 105 via any other suitable technology, including the example computing system described below. In an example, the interaction application 112 is an application that has a Know Your Customer ("KYC") relationship with institutions or other systems that manage or support a user account. For example, the interaction application 112 has a KYC relationship with the account manager system 150 that hosts a digital account manager 151. The interaction application 112 may provide recommendations for provider systems 120 for interactions, provide data and user information to the digital account manager 151 to support interactions, store user interests for dispersal to a publisher 170 or other system, or perform any other suitable tasks.

In other examples, the interaction application 112 may host, interact with, manage, support, or otherwise utilize an artificial intelligence ("AI") engine that identifies products or services that match the profile of the user. For example, the AI engine may determine, based on user interests, a particular provider system 120 that provides products of which the user would be interested.

The user computing device 110 also includes a data storage unit 113 accessible by the interaction application 112, or other applications. The example data storage unit 113 can include one or more tangible computer-readable storage devices. The data storage unit 113 can be stored on the user computing device 110 or can be logically coupled to the user computing device 110. For example, the data storage unit

113 can include on-board flash memory and/or one or more removable memory accounts or removable flash memory. In another example embodiments, the data storage unit 113 may reside in a cloud-based computing system.

An example provider system 120 comprises a data storage unit 123 and a cart 121. The provider system 120 may represent any suitable service provider, online store, provider, product provider, counterparty, or any other entity that associates a product to a user. In an example, the provider system 120 is an online retailer that receives orders from a user and uses a transport system 140 to deliver goods to an address of the user. In another example, the provider system 120 may be any other type of system that provides goods for delivery, such as a distribution center of a government or a hospital. The cart 121 may be an application, module, or other function of the provider system 120 that provides communicates with the user computing device 110 to receive payment and/or transport data and conduct interactions or transactions.

The data storage unit 123 can include any local or remote data storage structure accessible to the provider system 120 suitable for storing information. The data storage unit 123 can include one or more tangible computer-readable storage devices, or the data storage unit 123 may be a separate system, such as a different physical or virtual machine or a cloud-based storage service.

A third-party data system 130 may include a data storage unit 133. The third-party data system 130 performs the functions described herein to obscure sensitive data and provide the obscured data set to the user computing device 110, the provider system 120, the publisher 170, the transport system 140, or any other suitable party. The third-party data system 130 may be a stand-alone system, a function of a payment processing system, a function of a transporting system, a function of an online service provider, or any other type of system. The third-party data system 130 may obscure addresses, identifications, interests, tracking data, or any other suitable sensitive data as described herein to protect user data from publishers 170, provider systems 120, or any other observers.

The data storage unit 133 can include any local or remote data storage structure accessible to the third-party data system 130 suitable for storing information. The data storage unit 133 can include one or more tangible computer-readable storage devices, or the data storage unit 133 may be a separate system, such as a different physical or virtual machine or a cloud-based storage service.

The transport system 140 may be any system that is employed or directed to transport products to a delivery address. For example, the transport system 140 may be a national transporting company, a governmental transporting agency, a delivery function of a provider, or any other type of transporting service. The transport system 140 may use any number of servers, computing devices, or communication devices to receive instructions to transport, delivery addresses, products to transport, or any other needed data. The transport system 140 may provide tracking data for any transportations by logging statuses of transported products at multiple locations in the journey to the delivery address and providing the status to a requester.

The account manager system 150 provides a mechanism for conducting interactions with a provider system 120, publishers 170, or any other suitable system. The account manager system 150 may be any type of application, software, server, device, or other function that provides obscured data, payment information, delivery information, or other needed data to a provider system 120. The account manager system 150 receives data and requests from the provider system 120 associated with any interaction. The account manager system 150 may host a digital account manager 151 or any suitable payment application. The digital account manager 151 may store data that the user utilizes to conduct interactions with a provider system 120, such as account identification data or user interaction preferences. For example, the digital account manager 151 may store one or more payment instruments, such as credit cards, debit cards, prepaid cards, bank accounts, or any other type of payment instrument. The digital account manager 151 may present the payment instrument to the provider system 120 by communicating account information, data sets, or any other type of data to conduct the interactions.

The program system 160 may be represent any system that recommends programs to the provider system 120 based on the data known about the user. In certain examples, the programs may be frequent user programs, loyalty programs, offers for products, offers for discounts, or any other programs in which the user might participate. The data the program system 160 uses to provide the program may be obscured or limited. For example, the program system 160 only has the data that is provided to the provider system 120 by the third-party data system 130. The program system 160 may use an anonymized analytics database 161 to identify the offered programs. The anonymized analytics database 161 may store certain data about users, but not store any sensitive or identifying data about the users.

The publisher 170 represents any type of website or other interaction application with which a user interacts to receive digital content. For example, the publisher 170 may be an online game, a search engine, a social media application, a video sharing service, or any other provider of data or services to a user. The publisher 170 may receive digital content from a digital content provider 180. For example, if the publisher 170 is a search engine, certain results of a search may be provided by a digital content provider 180. In another example, if the publisher 170 is a game, then the digital content provider 180 may provide visual displays, popup windows, or other content to display with or on the game. If the publisher 170 is a social media site, then the digital content provider 180 may provide displays of content in certain portions of the window or popup windows. In other examples, the digital content is provided directly by the publisher 170 or by another external system.

It will be appreciated that the network connections shown are examples, and other means of establishing a communications link between the computers and devices can be used. Moreover, those having ordinary skill in the art having the benefit of the present disclosure will appreciate that the user computing device 110, provider system 120, the third-party data system 130, the transport system 140, the account manager system 150, systems 160, the publisher 170, and the digital content provider 180 illustrated in FIG. 1 can have any of several other suitable computer system configurations. For example, a provider system 120 embodied as a mobile phone or handheld computer may not include all the components described above.

Figure 4:
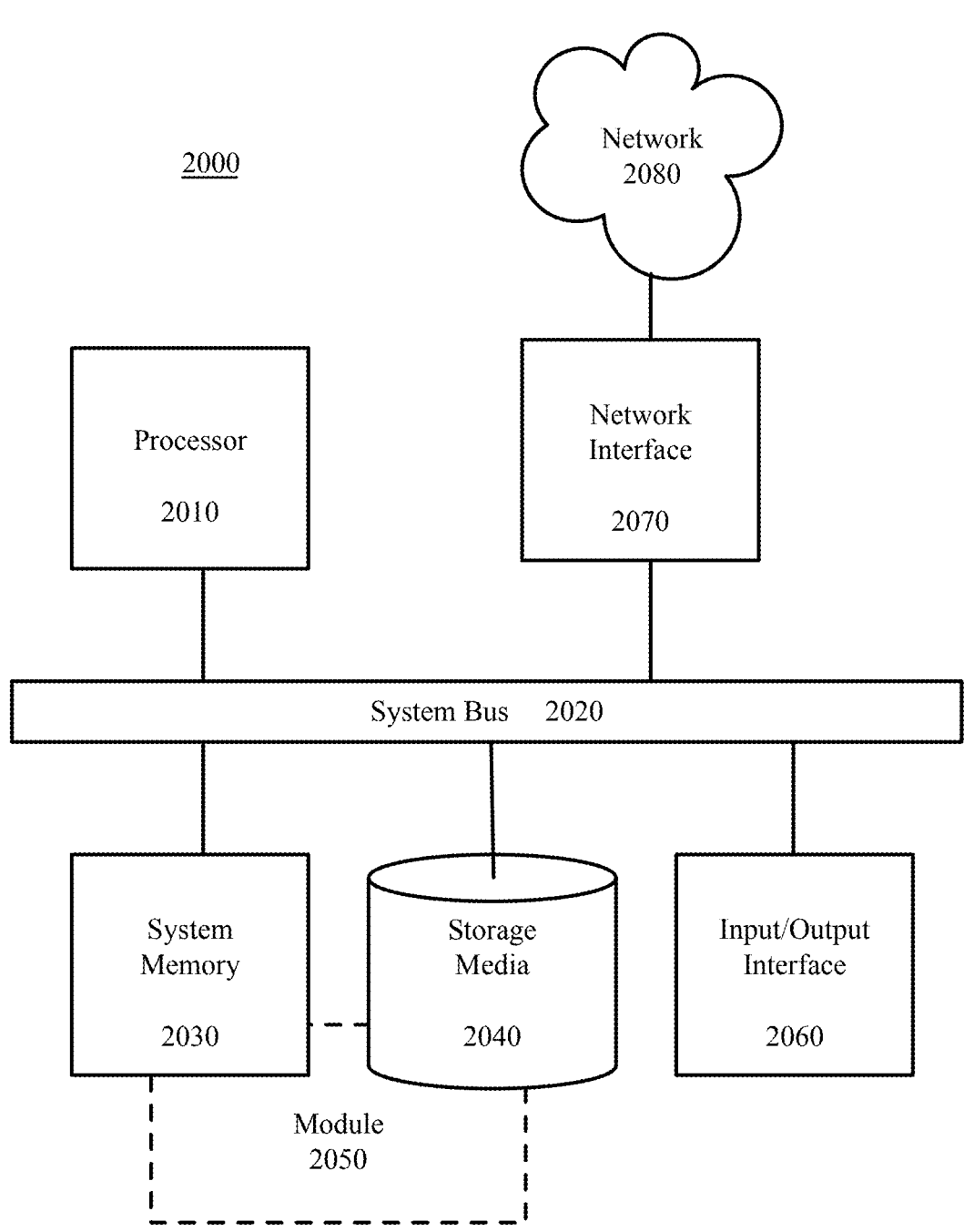
FIG. 4 is a block diagram depicting a computing machine and modules.

In example embodiments, the network computing devices and any other computing machines associated with the technology presented herein may be any type of computing machine such as, but not limited to, those discussed in more detail with respect to FIG. 4. Furthermore, any modules associated with any of these computing machines, such as modules described herein or any other modules (scripts, web content, software, firmware, or hardware) associated with the technology presented herein may by any of the modules discussed in more detail with respect to FIG. 4. The computing machines discussed herein may communicate with one another as well as other computer machines or communication systems over one or more networks, such as network 105. The network 105 may include any type of data or communications network, including any of the network technology discussed with respect to FIG. 4.

Example Processes

Figure 2:
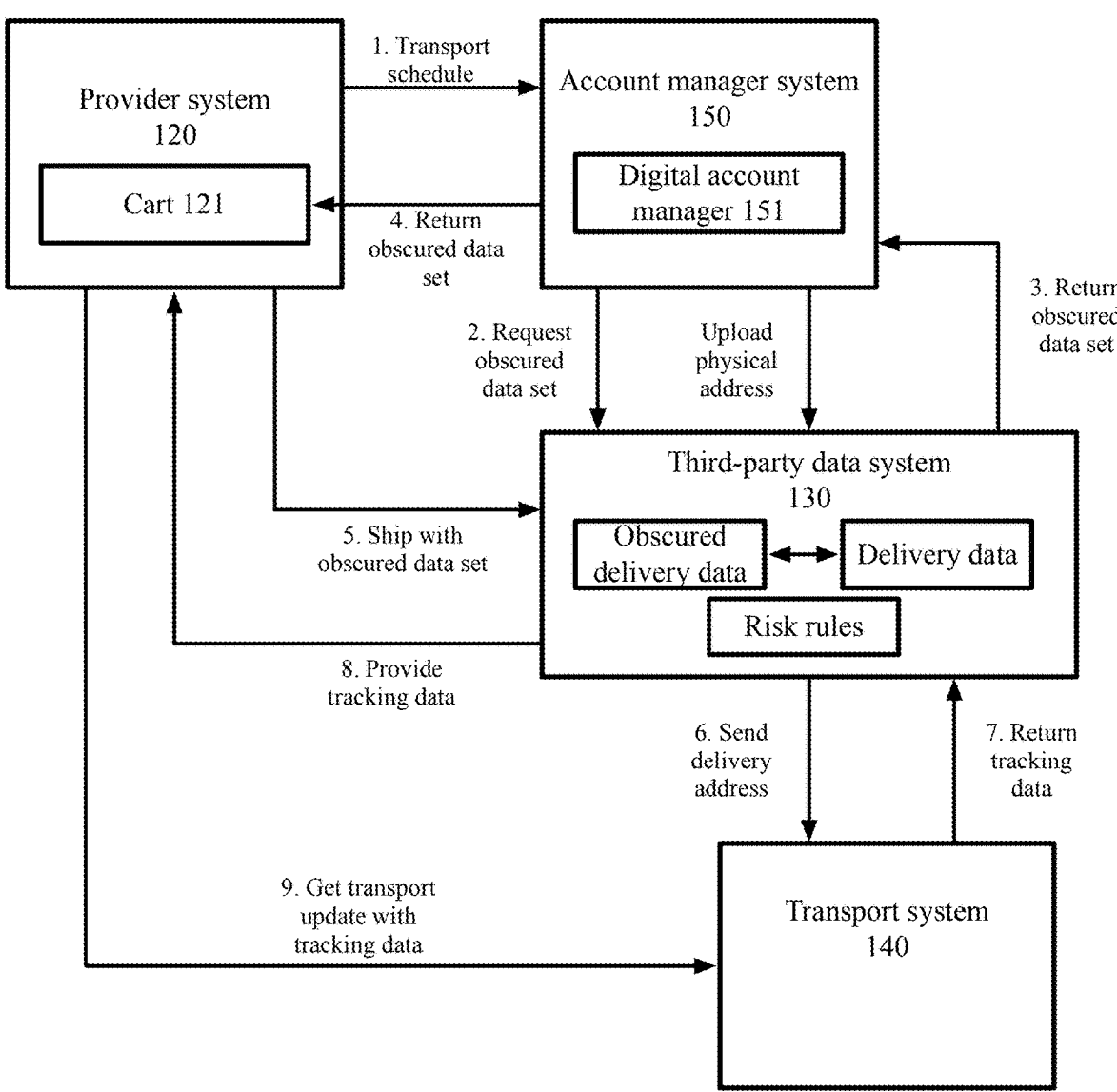
FIG. 2 is a block flow diagram depicting a method to provide obscured data sets for transport.
Figure 3:
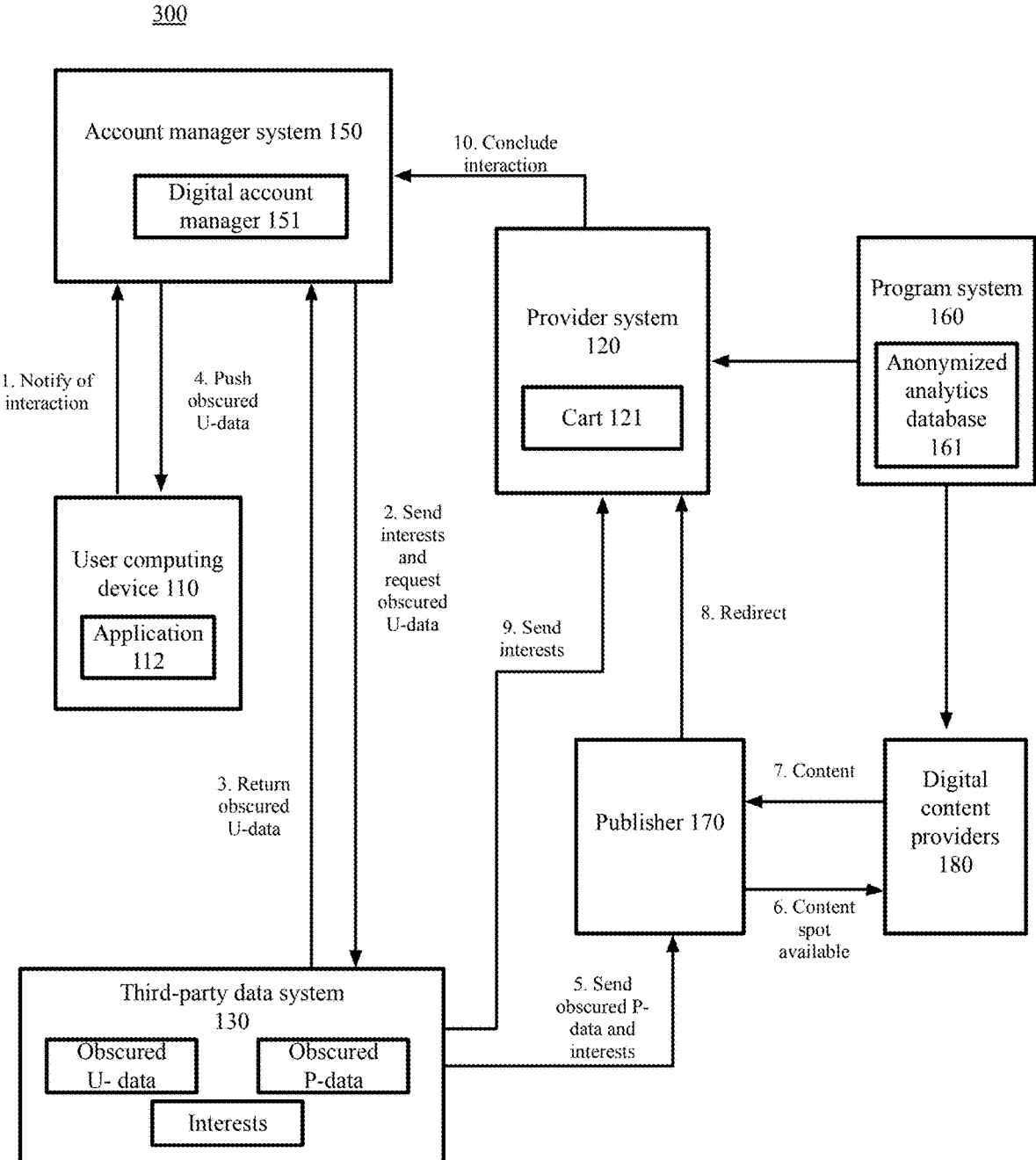
FIG. 3 is a block flow diagram depicting a method to provide obscured data sets for digital content.

The example methods illustrated in FIG. 2-3 are described hereinafter with respect to the components of the example architecture 100. The example methods also can be performed with other systems and in other architectures including similar elements.

Referring to FIG. 2, and continuing to refer to FIG. 1 for context, a block flow diagram depicting a method 200 to provide obscured data sets, in accordance with certain examples of the technology disclosed herein.

In step 1 of FIG. 2, the provider system 120 and the digital account manager 151 are at a transport scheduling page. A user may be accessing the digital account manager 151 on a user computing device 110 and communicating with the provider system 120 with the user computing device 110. For example, if the provider system 120 and the digital account manager 151 are functions of a distribution system, the transport scheduling page may be an application for scheduling deliveries from the provider system 120 to an address associated with the digital account manager 151. In another example, the transport scheduling page is a checkout page for an online transaction.

The transport scheduling page may be a page that summarizes the interaction, requests and receives payment information or other authorization, and requests a delivery address at which the product should be delivered. The digital account manager 151 receives the request for the delivery address and requests instructions from the user. The user may provide instructions for whether or not to provide a delivery address at the time of the request.

In the example, the user does not desire to provide the provider system 120 with the actual delivery address because the provider system 120 may be unfamiliar to the user, the provider system 120 has a history of suspicious behaviors, the provider system 120 is located in a risky geographic location, or for any reason the user determines that the provider system 120 is untrustworthy.

In step 2, the digital account manager 151 provides a request to the third-party data system 130 for an obscured data set. For a higher level of privacy protection, this data set may be created and used for a particular interaction only and will be discarded after the delivery is completed. The digital account manager 151 may provide the actual delivery address to the third-party data system 130 at the time of the delivery request or at an earlier time. For example, the digital account manager 151 may establish a delivery address with the third-party data system 130 at the time of registering an account, or at any other suitable time. If the digital account manager 151 requests a different delivery address than an established delivery address, the digital account manager 151 may provide the new delivery address at the time of the request for delivery with a request to obscure the new delivery address.

In step 3, the third-party data system 130 returns an obscured data set to the digital account manager 151. Obscuring of the delivery address or any other information replaces sensitive or private elements with a series of non-sensitive, randomly generated elements so that the link between the data set values and sensitive information cannot be reverse-engineered. For example, the address, a phone number, a name of the user, or any other suitable private data may be obscured. The obscured data may use a tokenization process to provide the data as a token or use any other type of digital encryption technology.

The obscuring of the data may use any available obscuring methods. These include tokenization with a key to create a theoretically reversible cryptographic function. Another process includes a function that cannot be reversed, such as a hash function. In another process, an index function or a number produced at random may be used. The obscured data set will become the exposed information, while the sensitive data that the obscured data represents is securely held, such as on a centralized server called the data set vault. Only in the data set vault can the original sensitive data be mapped back to its appropriate data set. These or any other type of commercially available processes may be used to obscure the data.

After the data set is created, the third-party data system 130 transmits the obscured data set to the digital account manager 151 to be used in the pending interaction or a future interaction. In examples, the obscured data set is only used for a single delivery and is deleted after use as a further security measure. In other examples, the third-party data system 130 transmits the obscured data set directly to the cart 121 or any other function of the provider system 120, if requested by the digital account manager 151.

In step 4, the digital account manager 151 communicates the obscured data set to the cart 121 or any other function of the provider system 120. In an example, the digital account manager 151 communicates the obscured data set concurrently or with payment information, such as with a credit card data set. The communication may be via a network, such as network 105, or via NFC, Bluetooth, Wi-Fi, or any other communication technology.

Upon receiving the transport data in the form of the obscured data set, the provider system 120 may complete the interaction and schedule delivery of a product. In certain examples, a financial interaction is not conducted, and the interaction may be for any other purpose that proceeds with a delivery of a product.

In step 5, the provider system 120 initiates the delivery with the obscured data set. The provider system 120 may perform any functions to provide the third-party data system 130 with the data and products for delivery. For example, the provider system 120 may communicate the obscured data set, a product for delivery, a time for pick-up from the provider system 120, a time for delivery to the user, payment for the delivery, product details, and any other suitable information. The provider system 120 may provide data to allow the transport system 140 to pick up the product to be transported to the delivery address, such as from a warehouse, a provider location, or any other location.

The provider system 120 provides the obscured data set to the third-party data system 130 along with the transport data that is not sensitive. The communication may be via any suitable technology such as via the network 105.

In another example, the provider system 120 provides the transport information directly to the transport system 140. For example, the provider system 120 may not be aware that the address is obscured or the provider system 120 may not be aware of which third-party data system 130 is capable of unmasking the obscured data set. The provider system 120 provides the obscured data set to the transport system 140 and relies on the transport system 140 to identify the delivery address. In this example, the transport system 140 recognizes that the obscured data set was obscured by the third-party data system 130. The transport system 140 provides the obscured data set to the third-party data system 130 and requests the delivery address.

In step 6, the third-party data system 130 provides the delivery address to the transport system 140. The third-party data system 130 unmasks the obscured data set, or otherwise extracts the delivery address from the obscured data set, such as via a detokenization. For example, the third-party data system 130 extracts the user account data in the unobscured data and identifies the delivery address associated with the user account. The third-party data system 130 associates the delivery address with the transport data and communicates the transport data to the transport system 140. The third-party data system 130 may communicate the delivery address, a product for delivery, a time for pick-up from the provider system 120, a time for delivery to the user, payment for the delivery, product details, and any other suitable information to the transport system 140.

In step 7, the transport system 140 communicates a tracking number or other tracking data set to the third-party data system 130. The transport system 140 prepares the product for delivery and proceeds with the delivery. For example, the transport system 140 packages the product if needed, attaches a label to the package, and transports the package towards the destination of the delivery address.

The transport system 140 may place a full delivery address label on the package. In another example, the transport system 140 places a label that only includes a representation of the obscured data set instead of any personal or sensitive delivery information. The obscured label may be unmasked or otherwise understood by only certain elements of the transport system 140. For example, an electronic scanner of the transport system 140 may be able to scan a representation of the data set to allow delivery while a human is unable to read the label.

In an example, instead of a tracking data set, a tracking number is provided. The tracking number is a conventional tracking number. In another example, the transport system 140 data obscures the tracking number and other data into an obscured tracking data set using any suitable data obscuring technology. In another example, the tracking data is obscured by the third-party data system 130. That is, the transport system 140 provides tracking data that includes the sensitive transporting data, and the third-party data system 130 data obscures the data into an obscured tracking data set for communication to the user computing device 110 or the provider system 120. The obscured tracking data set allows the tracking data to be communicated without fear of an unauthorized party reading the sensitive data of the user.

In step 8, the third-party data system 130 provides the tracking data set to the provider system 120. In an example, the provider system 120 makes a request for transporting updates to the third-party data system 130 or directly to the transport system 140. The third-party data system 130 replies with the tracking data set to identify the delivery associated with the request. In a continuing example, the provider system 120 receives a request from the digital account manager 151 for transporting updates. The provider system 120 provides a request to the third-party data system 130 for tracking data for display or communication to the digital account manager 151. The third-party data system 130 identifies the delivery associated with the request and communicates the tracking data set to the provider system 120.

In step 9, the provider system 120 requests transport updates or tracking data from the transport system 140 using the obscured tracking data set. For example, the provider system 120 communicates a request to the transport system 140 or the third-party data system 130 that includes a request for tracking data. The request may include the obscured tracking data set. The transport system 140 receives the obscured tracking data set and unmasks the tracking data set to obtain the data related to the delivery. In another example, the transport system 140 provides the received tracking data set to the third-party data system 130 with a request an unmasking of the tracking data set.

With the data from the unmasked tracking data set, the transport system 140 identifies data associated with the delivery, such as the current location, the delivery waypoints passed and scheduled, the delivery address, and any other suitable data.

The transport system 140 provides an update to the provider system 120 of the tracking data identified. In an example, the transport system 140 does not provide any personal information, such as the actual delivery address. For example, the transport system 140 may only update the third-party data system 130 that the delivery is in the city of the delivery address without disclosing the city name. In another example, the transport system 140 may only update the third-party data system 130 that the delivery is enroute with a local delivery driver. Any level of specificity in the provided update may be configured by the user, the third-party data system 130, the transport system 140, or any other suitable party.

In one example, the third-party data system 130 may optionally apply a set of risk rules before generating or providing an obscured data set. The risk rules may be a static set of rules or a continuously updated set of rules. The risk rules may determine when a delivery address should be obscured or when a delivery should be canceled or denied. The risk rules may be created or implemented by a machine learning algorithm or system operating on the third-party data system 130. The risk rules may detect illegitimate delivery data, such as an attempt to divert a delivery to an illegitimate actor. In another example, the risk rules may detect that an abnormal number of deliveries are being transported to a single address in a location that is associated with fraud.

In an example, the creation and application of the risk rules may be performed using one or more machine learning algorithms hosted by a server or other device of the third-party data system 130. As described in the Machine Learning section below, the data stored by the third-party data system 130 is used to train the machine learning algorithm to create predictive models of the locations, addresses, actions, systems, locations, devices, or any other characteristic of the parties to the transporting interaction.

The machine learning function imports or otherwise receives the data from the third-party data system 130, the provider system 120, the user computing device 110, and the transport system 140. The data is fed into the machine learning algorithm or otherwise provided as training data to the machine learning algorithm. As described herein, the data is processed and categorized by the machine learning algorithm. For example, addresses, deliveries, error logs, fraud logs, and outcomes of previous deliveries, are used as input data. The machine learning algorithm may extract non-trivial characteristics linking the data. For example, the input data to a neural network eventually becomes weights used by equations in nodes (e.g. one or more hidden layers transforms the input data into values to which the weights are applied and adjusted according to an output value). Therefore, the neural network "learns" indescribable patterns between inputs. These unseen connections, trends, and tendencies may not alone be indicative of an imminent failure, but a pattern that is not realistically observable by human analysis may provide a basis for a need for obscuring the data, initiating an investigation, altering the transporting process, or refusing to transport a product.

In an example, the machine learning algorithm determines relationships between a location of a transporting address, a type of product to be transported, and a requested delivery method. If an unseen connection between the three inputs suggests that a certain combination is indicative of a higher-than-normal fraud rate, then actions may be taken to reduce the risk. For example, a secondary verification of the delivery may be requested, a denial of the delivery, or a request to hold the delivery for further investigation may be recommended by the machine learning algorithm.

As described herein, different machine learning algorithms may be tested to determine which type of machine learning algorithm provides the most accurate predictions or results. For example, the results may be tested by comparing predicted results of applying different rule sets to historical data in which fraud was identified. The machine learning algorithm may deploy the model or algorithm selected for usage in real time based on the results of the testing. The results of the usage may be fed back to the machine learning algorithm to allow for adjustments to the selected algorithm. As additional results are received from user interactions, the model may be adjusted to better fit the data and thus make more accurate predictions.

The details of the method to train the machine learning algorithm are described in greater detail in the Machine Learning section below. In the examples herein, different machine learning algorithms utilized may include, but are not limited to, support vector machines, naive Bayes, neural networks, gradient boosting machines, random forests, and an ensemble of multiple algorithms. These algorithms are discussed in greater detail in the Machine Learning section below.

Referring to FIG. 3, and continuing to refer to FIG. 1 for context, a block flow diagram depicting a method 300 to provide obscured data sets for digital content, in accordance with certain examples of the technology disclosed herein.

In step 1 of FIG. 3, an interaction application 112 on a user computing device 110 notifies an account manager system 150 of an interaction. The interaction application 112 has a Know Your Customer ("KYC") relationship with the account manager system 150. In this arrangement, the user ID associated with the interaction application 112 is known to the account manager system 150. In an example, the account manager system 150 is associated with an institution that manages accounts of the user, such as a financial institution or an institution that manages secure access to a physical or digital space.

The interaction application 112 may recommend provider systems 170, initiate interactions, and communicate with an account manager system 150. The interaction application 112 hosts user interaction data, such as demographic data, user interests, account data, interaction histories, or any other suitable data. The interaction application 112 may be used by the user to search for items or webpages related to user interests. The interaction application 112 may be used by the user to recommend products or provider systems 120 based on user input data, historical data, data provided by the account manager system 150, or any other suitable data.

The user may indicate on a user interface of the interaction application 112 that the user is interested in a private interaction session with a provider system 120, a publisher 170, or another similar system. The user indicates that the interaction should be a private session, such as by selecting an option or a user interface object on the interaction application 112. In another example, the user may configure the interaction application 112 to always perform actions privately. An example request may be made by selecting an option for a private session with the provider system 120 to select a product for purchase. Another example request may be made by selecting an option for a private session with a publisher 170 for a session with a game, such as a mobile game.

When the request for a private interaction is recognized, the interaction application 112 notifies the account manager system 150, such as via an Internet connection over the network 105.

In step 2, after recognizing the request for a private interaction, the account manager system 150 communicates user interests and requests an obscured user data set ("U-data"). The U-data may be any set of data that has obscured or protected private or sensitive data of the user, while still providing enough data to allow the interaction to proceed. The account manager system 150 communicates to the third-party data system 130 via any suitable technology, such as an Internet communication over the network 105. The account manager system 150 may utilize any suitable third-party data system 130, such as a third-party data system 130 that is associated with the interaction application 112 by the user or any other party.

The communicated interests may include any interests identified by the account manager system 150. The interests may include any interests that are associated with the provider system 120 or the publisher 170 to which the user desires to interact. For example, the interests provided to a gaming publisher 170 may include media that the user prefers and types of games the user has previously purchased. In another example, the interests provided to a social media platform may include the user's region, a general age range of the user, and a list of social media platforms to which the user subscribes. The user or the account manager system 150 may determine which types of user interests are not to be shared with certain types of publishers to protect the anonymity of the user. The interests may be labeled by the account manager system 150 based on the type of data. Certain data may be labeled as data to be tokenized or otherwise obscured. Certain data may be labeled as data to be shared with a publisher 170 or a provider system 120. Certain data may be labeled as data to be generalized or anonymized before sharing.

In step 3, the third-party data system 130 returns the obscured U-data to the account manager system 150. Obscuring of the sensitive data or any other information replaces sensitive or private elements with a series of non-sensitive, randomly generated elements so that the link between the data set values and sensitive information cannot be reverse-engineered. For example, the address, a phone number, a name of the user, demographic data, or any other suitable private data may be obscured. The obscured data may use a tokenization process to provide the data as a token or use any other type of digital encryption technology.

The obscuring of the data may use any available obscuring methods. These include tokenization with a key to create a theoretically reversible cryptographic function. Another process includes a function that cannot be reversed, such as a hash function. In another process, an index function or a number produced at random may be used. The obscured data set will become the exposed information, while the sensitive data that the obscured data represents is securely held, such as on a centralized server called the data set vault. Only in the data set vault can the original sensitive data be mapped back to its appropriate data set. These or any other type of commercially available processes may be used to obscure the data.

In an example, the U-data may have data, either obscured or not obscured, to conduct a transaction with a provider system 120. Other data may be included in the U-data to perform any other type of interaction, such as an authorization to a secure environment.

In step 4, the account manager system 150 pushes the obscured U-data to the interaction application 112. The account manager system 150 further pushes the U-data to the digital account manager 151. The digital account manager 151 may be used to interact with a provider system 120 or any other system to conduct transactions or other interactions.

The third-party data system 130 creates a publisher data set ("P-data"). The P-data may include some obscured data and some unobscured data. The P-data is prepared for communication to a publisher 170 and/or a provider system 120.

In an example, some P-data may include long-term interests of the user and some may include one-time interests. The third-party data system 130 may determine what type of interests to provide to systems, such as the publisher 170 or the provider system 120. The long-term interests may be configured to expire and become obscured after a longer time period. For example, when interests are provided to a provider system 120, the user may want the provider system 120 to have access to the data for multiple site visits from the user. For example, if the user is planning a vacation, the user may want the provider system 120 to provide digital content or programs related to the vacation for the next month. These long term interests may include products such as cars, televisions, or a couch.

Conversely, the one-time interests may be configured to expire and become obscured after a single use, in one hour, in one day, or in any suitable time period or number of uses. The third-party data system 130 might communicate only short-term interests to the publisher 170 when the user is playing a game, because the publisher 170 might be less trustworthy, the publisher 170 is not a provider of the products, the publisher 170 might only be visited a limited number of times by the user, or for any suitable reason. These types of interest might include restaurants, bars, and concerts, or any other suitable short-term interests. For example, if the user is searching for restaurants on a search engine, the user may want the publisher 170 to provide digital content or programs related to the restaurant preferences of the user, but not store that data for future use. The one-time interest provided may be used by the publisher 170 and then disappear or become obscured.

The P-data may include certain data that is useful for provided digital content for a user, such as to select a product for display or to select items of interest to a general geographic region. The data may generalize the data such that digital content is useful without providing data that is specific enough to identify a user.

In step 5, the third-party data system 130 communicates the P-data and other interests to the publisher 170. The P-data includes enough unobscured data that a publisher 170 or a provider 120 may provide relevant digital content but not enough unobscured data that the user may be identified. Further, even if a system obtained the U-data and the P-data, the system would not be able to identify the user from the combination or to associate the user from the P-data with the user from the U-data.

In conventional systems, the publisher 170 attempts to "fingerprint" the user by analyzing data provided to the publisher or gathered by the publisher. For example, conventional publishers 170 use techniques such as pixel capture or device tracing to gather data about the user or the user computing device 110. Conventional publishers 170 use collected user data that is provided to the publisher 170, such as usernames, user addresses, user interests, demographic data, payment instrument data, or any other data that is provided by the digital account manager 151, the user computing device 110, the interaction application 112, or any other device or system in the current session or any previous sessions. The conventional publishers 170 use the created fingerprint of the user to select digital content to provide to the user. The conventional publishers 170 may further store the data for future use or access. The conventional publishers 170 may develop a significant store of data that would allow a publisher 170 or any other system to identify the user and gather sensitive or private data about the user. Further, conventional publishers 170 may sell the sensitive or private data to any other system.

The third-party data system 130, however, provides obscured P-data. The P-data may include data such as user interests, user histories, user device types, or other relevant user data that the third-party data system 130 has determined is not sensitive data or data that may not be combined with U-data to identify a user. The P-data preferably provides enough data that relevant digital content may be selected by the publisher 170 or by the digital content provider 180 that matches the interests of the user but is not sufficient to identify the user. Further, the P-data may be provided in a token or other format that causes the data to expire. For example, the P-data may be in a token that expires after one use, one day, one session, or at any other expiration deadline. Any tokenization process as described herein may be used.

In step 6, the publisher 170 communicates a request to a digital content provider 180 that a digital content spot is available. For example, the publisher 170 may provide an opportunity for a different provider, such as a digital content provider 180, to bid on, purchase, request, or otherwise obtain an opportunity to provide digital content to be displayed to the user when the user is viewing the site of the publisher 170. For example, if the publisher 170 is a video sharing service, the user may have accessed a webpage of the publisher 170. The webpage may have one or more locations reserved for displaying digital content such as calendars, offers, sports scores, or community notices.

In a conventional system, the publisher 170 would provide a user ID, user interests, user histories, demographic data, location data, net worth data, or any other user data to allow a digital content provider 180 to determine if the user is a good target for digital content and what digital content to provide. For example, the publisher 170 provides the sensitive user data and the digital content provider 180 compares the data to a database to determine which digital content to provide and if the user is a valuable target for receiving the data. In these conventional systems, the digital content provider 180 may store the sensitive user data whether digital content is provided or not. The digital content provider 180 may use the data for any other purposes, such as to sell or trade to other systems. For these reasons, the user may not wish for the digital content provider 180 to have the sensitive or identifying data.

When the third-party data system 130 provides the P-data, however, the sensitive user data is not communicated. The only data communicated for use by the publisher 170 or the digital content provider 180 is data that is generic or otherwise untraceable back to the user. For example, the P-data may include interests such as an interest in snow skiing, cooking, sports cars, and reading. The P-data may include a generic location such as "Upper Midwest United States" and "mid-size city." The P-data may include user history data such as the types of products the user typically buys online. The data does not include any personally identifiable data, a username, a user address, a user account number, private demographic data, or any other sensitive data.

With the P-data, the publisher 170 is able to send the request for digital content to the digital content provider 180 with the P-data, and the digital content provider 180 is able to determine if the user is a target for digital content. Even without the user sensitive data, the digital content provider 180 may still determine that digital content related to snow skiing near the midwestern United States would be a match for the user.

In step 7, the digital content provider 180 provides digital content to the publisher 170 for display on the user computing device 110. The digital content provider 180 matches the content to the user interests and provides content that is displayed on the user interface of the publisher 170. In an example, the content is displayed on a banner strip at the top of the display, a popup window, an overlaid window, an inset window, or any other location. In one example, the digital content is an offer for a product or a service.

The digital content provider 180 may provide a fee to the publisher 170 for the opportunity to provide the digital content. For example, the digital content provider 180 may have won an auction or other bid to provide the digital content.

The publisher 170 provides the content requested by the user, such as a game or a set of search results. The publisher 170 also displays the digital content provided by the digital content provider 180. The user views the display on the interaction application 112 or other user interface on the user computing device 110.

In step 8, the user is directed to the provider system 120. In certain examples, the user is interested in a display of digital content on the website of the publisher 170 and selects an option to explore the subject of the digital content. For example, if the digital content is associated with a product offered by the provider system 120, the display may provide a button, link, or other user interface object to direct the user to a website or other display of the provider system 120. If the user selects the object, then the user computing device 110 may leave the website of the publisher 170 and open a website of the provider system 120.

In an example, the publisher 170 provides the P-data to the provider system 120 when the user is redirected. The P-data provided may be all of the P-data provided to the provider system 120 or a subset of that data. The provider system 120 is thus provided with the interests or other data in the P-data to allow the provider system 120 to provide targeted data to the user.

In an optional example, the user is directed to the provider system 120 via an option on the interaction application 112. For example, if a user entered a selection on the interaction application 112 that the user is interested in a product offered by the provider system 120, the user interface of the interaction application 112 may present an interface object, link, button, or other option to direct the display of the user computing device 110 to the provider system 120. In the example, the interaction application 112, the account manager system 150, or any other suitable system may determine a list of providers associated with a search term or other entry of the user. The list may include the provider system 120.

In step 9, the third-party data system 130 provides the user interests to the provider system 120. When the user enters a selection to be directed to a website or other user interface of the provider system 120, the account manager system 150 or the interaction application 112 communicates a request to the third-party data system 130 to provide the interests of the user to the provider system 120. In certain examples, the third-party data system 130 provides the P-data that may include the interests of the user. In other examples, the third-party data system 130 provides a subset of data from the P-data.

The provider system 120 utilizes the interests and other P-data of the user to tailor the user experience on the provider system 120. The provider system 120 may provide the user interests to the program system 160. The program system 160 may utilize the anonymized analytics database 161 to select programs that may be of interest to the user based on the anonymous interests and P-data provided. For example, if the P-data indicated that the user is located in a large east coast city, buys tennis equipment, and frequently attends tennis matches, then the anonymized analytics database 161 would be used to search for programs that match this data. The program might be a schedule of tennis clinics, an offer for tickets to a tennis match, a frequent tennis player program, a loyalty program for people that buy tennis balls regularly, or a discount for signing up for a new account with the provider system 120. The program system 160 provides the program data to the provider system 120 for display to the user on the website of the provider system 120.

In step 10, the user and the provider system 120 conduct the interaction. The provider system 120 may request data from the digital account manager 151 to conduct the interaction. For example, the user may request that a product or service be placed in the cart 121 and then initiate the process to provide data to obtain the product or service. The digital account manager 151 receives the request to provide data for the interaction and provides the U-data to the provider system 120.

In an example, if the interaction was a request for access to a set of data, the provider system 120 provides the data upon authorization. The authorization may be provided by the digital account manager 151 via the U-data. The U-data may include the data required to authorize the interaction without including any unnecessary personal data. In another example, if the interaction was a request for a transaction to purchase a product, the U-data may include a payment instrument or other data needed to conduct the transaction. In the example, the payment data may be tokenized, sensitive data may be obscured or omitted, or only the minimum information needed to conduct the interaction is provided.

The provided U-data may not be combined with the P-data or other user data collected by the provider system 120 to identify the user or protected sensitive data of the user. The provider system 120 is unable to store sufficient data about the user to create a file of sensitive data that is traceable to the user. The interests or other P-data may further be generic enough that the data is unusable to identify the user or sensitive data about the user.

In another example, the interaction application 112 utilizes an AI engine to perform certain functions described herein. The AI engine may be a function of the interaction application 112, a third party system, a function of the account manager system 150, a function on a cloud service, or any other type of system. The AI engine may use any machine learning process described herein or any other suitable type of AI.

The interaction application 112 may use the AI engine to determine the type of provider systems 120 to recommend to the user, types of offers to recommend, types of interests that best represent the user to other systems, the types of interests that are long-term or short-term. The AI engine may collect data such as interests searched by the user, demographic data, selections made by the user, publishers 170 visited, provider systems 120 visited, interaction histories of the user, transactions of the provider systems 120, or any other suitable data.

Based on one or more of the machine learning processes described herein, the AI engine may determine which provider systems 120 the user would be most interested in, what products offered by the provider system 120 that the user may be interested in, other interests of the user, what offers to target, or any other predictions or recommendations. The AI engine may provide the predictions, recommendations, or targeted offers to the interaction application 112 to allow the interaction application 112 to provide more useful or accurate search results, offers, recommendations, or other data to the user.

In an example, the machine learning process may be provided user interaction data that indicates that the user has a 12-month subscription to an Internet provider. The machine learning process may identify that a majority of users resubscribe at the 11-month date. The machine learning process determines that the user should be provided offers for subscriptions starting at the 10-month date.

Machine Learning

Machine learning is a field of study within artificial intelligence that allows computers to learn functional relationships between inputs and outputs without being explicitly programmed.

The term "Artificial Intelligence" refers to a quantitative method, system, or approach ("techniques") that emulates human intelligence via computer programs. These can be used to make estimates, predictions, recommendations, or decisions in manners that go beyond classical, statistical, mathematical, econometric, or financial approaches.

Machine learning is the subset of AI that derives representations or inferences from data without explicitly programming every parameter representation or computer step (for example, Random Forest or Artificial Neural Network based algorithm approaches). In contrast, AI techniques that are not members of the machine learning subset include techniques such as fuzzy logic, complex dependency parsing techniques for natural language processing.

Machine learning involves a module comprising algorithms that may learn from existing data by analyzing, categorizing, or identifying the data. Such machine-learning algorithms operate by first constructing a model from training data to make predictions or decisions expressed as outputs. In example embodiments, the training data includes data for one or more identified features and one or more outcomes, for example using user transporting histories to identify that a failure is likely. Although example embodiments are presented with respect to a few machine-learning algorithms, the principles presented herein may be applied to other machine-learning algorithms.

Data supplied to a machine learning algorithm can be considered a feature, which can be described as an individual measurable property of a phenomenon being observed. The concept of feature is related to that of an independent variable used in statistical techniques such as those used in linear regression. The performance of a machine learning algorithm in pattern recognition, classification and regression is highly dependent on choosing informative, discriminating, and independent features. Features may comprise numerical data, categorical data, time-series data, strings, graphs, or images.

In general, there are two categories of machine learning problems: classification problems and regression problems. Classification problems, also referred to as categorization problems, aim at classifying items into discrete category values. Training data teaches the classifying algorithm how to classify. In example embodiments, features to be categorized may include interaction data, which can be provided to the classifying machine learning algorithm and then placed into categories of, for example, interactions with provider X, requesting data type Y, from user computing device Z, at geolocation A, or using application B. Regression algorithms aim at quantifying and correlating one or more features. Training data teaches the regression algorithm how to correlate the one or more features into a quantifiable value.

Embedding

In one example, the machine learning module may use embedding to provide a lower dimensional representation, such as a vector, of features to organize them based off respective similarities. In some situations, these vectors can become massive. In the case of massive vectors, particular values may become very sparse among a large number of values (e.g., a single instance of a value among 50,000 values). Because such vectors are difficult to work with, reducing the size of the vectors, in some instances, is necessary. A machine learning module can learn the embeddings along with the model parameters. In example embodiments, features such as geolocation can be mapped to vectors implemented in embedding methods. In example embodiments, embedded semantic meanings are utilized. Embedded semantic meanings are values of respective similarity. For example, the distance between two vectors, in vector space, may imply two values located elsewhere with the same distance are categorically similar. Embedded semantic meanings can be used with similarity analysis to rapidly return similar values. In example embodiments, the methods herein are developed to identify meaningful portions of the vector and extract semantic meanings between that space.

Training Methods

In example embodiments, the machine learning module can be trained using techniques such as unsupervised, supervised, semi-supervised, reinforcement learning, transfer learning, incremental learning, curriculum learning techniques, and/or learning to learn. Training typically occurs after selection and development of a machine learning module and before the machine learning module is operably in use. In one aspect, the training data used to teach the machine learning module can comprise input data such as user transporting histories.

Unsupervised and Supervised Learning

In an example embodiment, unsupervised learning is implemented. Unsupervised learning can involve providing all or a portion of unlabeled training data to a machine learning module. The machine learning module can then determine one or more outputs implicitly based on the provided unlabeled training data. In an example embodiment, supervised learning is implemented. Supervised learning can involve providing all or a portion of labeled training data to a machine learning module, with the machine learning module determining one or more outputs based on the provided labeled training data, and the outputs are either accepted or corrected depending on the agreement to the actual outcome of the training data. In some examples, supervised learning of machine learning system(s) can be governed by a set of rules and/or a set of labels for the training input, and the set of rules and/or set of labels may be used to correct inferences of a machine learning module.

Semi-Supervised and Reinforcement Learning

In one example embodiment, semi-supervised learning is implemented. Semi-supervised learning can involve providing all or a portion of training data that is partially labeled to a machine learning module. During semi-supervised learning, supervised learning is used for a portion of labeled training data, and unsupervised learning is used for a portion of unlabeled training data. In one example embodiment, reinforcement learning is implemented. Reinforcement learning can involve first providing all or a portion of the training data to a machine learning module and as the machine learning module produces an output, the machine learning module receives a "reward" signal in response to a correct output. Typically, the reward signal is a numerical value and the machine learning module is developed to maximize the numerical value of the reward signal. In addition, reinforcement learning can adopt a value function that provides a numerical value representing an expected total of the numerical values provided by the reward signal over time.

Transfer Learning

In one example embodiment, transfer learning is implemented. Transfer learning techniques can involve providing all or a portion of a first training data to a machine learning module, then, after training on the first training data, providing all or a portion of a second training data. In example embodiments, a first machine learning module can be pre-trained on data from one or more computing devices. The first trained machine learning module is then provided to a computing device, where the computing device is intended to execute the first trained machine learning model to produce an output. Then, during the second training phase, the first trained machine learning model can be additionally trained using additional training data, where the training data can be derived from kernel and non-kernel data of one or more computing devices. This second training of the machine learning module and/or the first trained machine learning model using the training data can be performed using either supervised, unsupervised, or semi-supervised learning. In addition, it is understood transfer learning techniques can involve one, two, three, or more training attempts. Once the machine learning module has been trained on at least the training data, the training phase can be completed. The resulting trained machine learning model can be utilized as at least one of trained machine learning module.

Incremental and Curriculum Learning

In one example embodiment, incremental learning is implemented. Incremental learning techniques can involve providing a trained machine learning module with input data that is used to continuously extend the knowledge of the trained machine learning module. Another machine learning training technique is curriculum learning, which can involve training the machine learning module with training data arranged in a particular order, such as providing relatively easy training examples first, then proceeding with progressively more difficult training examples. As the name suggests, difficulty of training data is analogous to a curriculum or course of study at a school.

Learning to Learn

In one example embodiment, learning to learn is implemented. Learning to learn, or meta-learning, comprises, in general, two levels of learning: quick learning of a single task and slower learning across many tasks. For example, a machine learning module is first trained and comprises of a first set of parameters or weights. During or after operation of the first trained machine learning module, the parameters or weights are adjusted by the machine learning module. This process occurs iteratively on the success of the machine learning module. In another example, an optimizer, or another machine learning module, is used wherein the output of a first trained machine learning module is fed to an optimizer that constantly learns and returns the final results. Other techniques for training the machine learning module and/or trained machine learning module are possible as well.

Contrastive Learning

In example embodiment, contrastive learning is implemented. Contrastive learning is a self-supervised model of learning in which training data is unlabeled is considered as a form of learning in-between supervised and unsupervised learning. This method learns by contrastive loss, which separates unrelated (i.e., negative) data pairs and connects related (i.e., positive) data pairs. For example, to create positive and negative data pairs, more than one view of a datapoint, such as rotating an image or using a different time-point of a video, is used as input. Positive and negative pairs are learned by solving dictionary look-up problem. The two views are separated into query and key of a dictionary. A query has a positive match to a key and negative match to all other keys. The machine learning module then learns by connecting queries to their keys and separating queries from their non-keys. A loss function, such as those described herein, is used to minimize the distance between positive data pairs (e.g., a query to its key) while maximizing the distance between negative data points. See e.g., Tian, Yonglong, et al. "What makes for good views for contrastive learning?" Advances in Neural Information Processing Systems 33 (2020): 6827-6839.

Pre-Trained Learning

In example embodiments, the machine learning module is pre-trained. A pre-trained machine learning model is a model that has been previously trained to solve a similar problem. The pre-trained machine learning model is generally pre-trained with similar input data to that of the new problem. A pre-trained machine learning model further trained to solve a new problem is generally referred to as transfer learning, which is described herein. In some instances, a pre-trained machine learning model is trained on a large dataset of related information. The pre-trained model is then further trained and tuned for the new problem. Using a pre-trained machine learning module provides the advantage of building a new machine learning module with input neurons/nodes that are already familiar with the input data and are more readily refined to a particular problem. See e.g., Diamant N, et al. Patient contrastive learning: A performant, expressive, and practical approach to electrocardiogram modeling. PLOS Comput Biol. 2022 Feb. 14; 18(2):e1009862.

In some examples, after the training phase has been completed but before producing predictions expressed as outputs, a trained machine learning module can be provided to a computing device where a trained machine learning module is not already resident, in other words, after training phase has been completed, the trained machine learning module can be downloaded to a computing device. For example, a first computing device storing a trained machine learning module can provide the trained machine learning module to a second computing device. Providing a trained machine learning module to the second computing device may comprise one or more of communicating a copy of trained machine learning module to the second computing device, making a copy of trained machine learning module for the second computing device, providing access to trained machine learning module to the second computing device, and/or otherwise providing the trained machine learning system to the second computing device. In example embodiments, a trained machine learning module can be used by the second computing device immediately after being provided by the first computing device. In some examples, after a trained machine learning module is provided to the second computing device, the trained machine learning module can be installed and/or otherwise prepared for use before the trained machine learning module can be used by the second computing device.

After a machine learning model has been trained it can be used to output, estimate, infer, predict, generate, produce, or determine, for simplicity these terms will collectively be referred to as results. A trained machine learning module can receive input data and operably generate results. As such, the input data can be used as an input to the trained machine learning module for providing corresponding results to kernel components and non-kernel components. For example, a trained machine learning module can generate results in response to requests. In example embodiments, a trained machine learning module can be executed by a portion of other software. For example, a trained machine learning module can be executed by a result daemon to be readily available to provide results upon request.

In example embodiments, a machine learning module and/or trained machine learning module can be executed and/or accelerated using one or more computer processors and/or on-device co-processors. Such on-device co-processors can speed up training of a machine learning module and/or generation of results. In some examples, trained machine learning module can be trained, reside, and execute to provide results on a particular computing device, and/or otherwise can make results for the particular computing device.

Input data can include data from a computing device executing a trained machine learning module and/or input data from one or more computing devices. In example embodiments, a trained machine learning module can use results as input feedback. A trained machine learning module can also rely on past results as inputs for generating new results. In example embodiments, input data can comprise user transporting histories, and, when provided to a trained machine learning module, results in output data such as that a failure is likely. The output can then be provided to a user to inspect a component or fiber cable.

ALGORITHMS

Different machine-learning algorithms have been contemplated to carry out the embodiments discussed herein. For example, linear regression (LiR), logistic regression (LoR), Bayesian networks (for example, naive-bayes), random forest (RF) (including decision trees), neural networks (NN) (also known as artificial neural networks), matrix factorization, a hidden Markov model (HMM), support vector machines (SVM), K-means clustering (KMC), K-nearest neighbor (KNN), a suitable statistical machine learning algorithm, and/or a heuristic machine learning system for classifying or evaluating whether one or more rules would be useful to identify a likely failure.

The methods described herein can be implemented with more than one machine learning method. The machine learning system can use a combination of machine learning algorithms. The machine learning algorithms may be of the same type or of different types. For example, a first machine learning algorithm may be trained for a first type of result, while a second machine learning algorithm may be trained for a second type of result. In certain examples, the first type of result may be an input into the second machine learning algorithm, while in other examples, the two results are combined to produce a third result. In certain examples, the first and second types of results are both inputs into a third machine learning algorithm that produces the third result.

Linear Regression (LiR)

In one example embodiment, linear regression machine learning is implemented. LiR is typically used in machine learning to predict a result through the mathematical relationship between an independent and dependent variable. A simple linear regression model would have one independent variable (x) and one dependent variable (y). A representation of an example mathematical relationship of a simple linear regression model would be y=mx+b. In this example, the machine learning algorithm tries variations of the tuning variables m and b to optimize a line that includes all the given training data.

The tuning variables can be optimized, for example, with a cost function. A cost function takes advantage of the minimization problem to identify the optimal tuning variables. The minimization problem preposes the optimal tuning variable will minimize the error between the predicted outcome and the actual outcome. An example cost function may comprise summing all the square differences between the predicted and actual output values and dividing them by the total number of input values and results in the average square error.

To select new tuning variables to reduce the cost function, the machine learning module may use, for example, gradient descent methods. An example gradient descent method comprises evaluating the partial derivative of the cost function with respect to the tuning variables. The sign and magnitude of the partial derivatives indicate whether the choice of a new tuning variable value will reduce the cost function, thereby optimizing the linear regression algorithm. A new tuning variable value is selected depending on a set threshold. Depending on the machine learning module, a steep or gradual negative slope is selected. Both the cost function and gradient descent can be used with other algorithms and modules mentioned throughout. For the sake of brevity, both the cost function and gradient descent are well known in the art and are applicable to other machine learning algorithms and may not be mentioned with the same detail.

LiR models may have many levels of complexity comprising one or more independent variables. Furthermore, in an LiR function with more than one independent variable, each independent variable may have the same one or more tuning variables or each, separately, may have their own one or more tuning variables. The number of independent variables and tuning variables will be understood to one skilled in the art for the problem being solved. In example embodiments, user transporting histories are used as the independent variables to train a LiR machine learning module, which, after training, is used to estimate, for example, whether fraud is likely.

Logistic Regression (LoR)

In one example embodiment, logistic regression machine learning is implemented. Logistic Regression, often considered a LiR type model, is typically used in machine learning to classify information, such as user transporting histories into categories such as whether fraud is likely. LoR takes advantage of probability to predict an outcome from input data. However, what makes LoR different from a LiR is that LoR uses a more complex logistic function, for example a sigmoid function. In addition, the cost function can be a sigmoid function limited to a result between 0 and 1. For example, the sigmoid function can be of the form $f(x)=1/(1+e^{-x})$, where x represents some linear representation of input features and tuning variables. Similar to LiR, the tuning variable(s) of the cost function are optimized (typically by taking the log of some variation of the cost function) such that the result of the cost function, given variable representations of the input features, is a number between 0 and 1, preferably falling on either side of 0.5. As described in LiR, gradient descent may also be used in LoR cost function optimization and is an example of the process. In example embodiments, user transporting histories are used as the independent variables to train a LoR machine learning module, which, after training, is used to estimate, for example, whether fraud is likely.

Bayesian Network

In one example embodiment, a Bayesian Network is implemented. BNs are used in machine learning to make predictions through Bayesian inference from probabilistic graphical models. In BNs, input features are mapped onto a directed acyclic graph forming the nodes of the graph. The edges connecting the nodes contain the conditional dependencies between nodes to form a predicative model. For each connected node the probability of the input features resulting in the connected node is learned and forms the predictive mechanism. The nodes may comprise the same, similar or different probability functions to determine movement from one node to another. The nodes of a Bayesian network are conditionally independent of its non-descendants given its parents thus satisfying a local Markov property. This property affords reduced computations in larger networks by simplifying the joint distribution.

There are multiple methods to evaluate the inference, or predictability, in a BN but only two are mentioned for demonstrative purposes. The first method involves computing the joint probability of a particular assignment of values for each variable. The joint probability can be considered the product of each conditional probability and, in some instances, comprises the logarithm of that product. The second method is Markov chain Monte Carlo (MCMC), which can be implemented when the sample size is large. MCMC is a well-known class of sample distribution algorithms and will not be discussed in detail herein.

The assumption of conditional independence of variables forms the basis for Naïve Bayes classifiers. This assumption implies there is no correlation between different input features. As a result, the number of computed probabilities is significantly reduced as well as the computation of the probability normalization. While independence between features is rarely true, this assumption exchanges reduced computations for less accurate predictions, however the predictions are reasonably accurate. In example embodiments, user transporting histories are mapped to the BN graph to train the BN machine learning module, which, after training, is used to estimate whether fraud is likely.

Random Forest

In one example embodiment, random forest ("RF") is implemented. RF consists of an ensemble of decision trees producing individual class predictions. The prevailing prediction from the ensemble of decision trees becomes the RF prediction. Decision trees are branching flowchart-like graphs comprising of the root, nodes, edges/branches, and leaves. The root is the first decision node from which feature information is assessed and from it extends the first set of edges/branches. The edges/branches contain the information of the outcome of a node and pass the information to the next node. The leaf nodes are the terminal nodes that output the prediction. Decision trees can be used for both classification as well as regression and is typically trained using supervised learning methods. Training of a decision tree is sensitive to the training data set. An individual decision tree may become over or under-fit to the training data and result in a poor predictive model. Random forest compensates by using multiple decision trees trained on different data sets. In example embodiments, user transporting histories are used to train the nodes of the decision trees of a RF machine learning module, which, after training, is used to estimate whether fraud is likely.

Gradient Boosting

In an example embodiment, gradient boosting is implemented. Gradient boosting is a method of strengthening the evaluation capability of a decision tree node. In general, a tree is fit on a modified version of an original data set. For example, a decision tree is first trained with equal weights across its nodes. The decision tree is allowed to evaluate data to identify nodes that are less accurate. Another tree is added to the model and the weights of the corresponding underperforming nodes are then modified in the new tree to improve their accuracy. This process is performed iteratively until the accuracy of the model has reached a defined threshold or a defined limit of trees has been reached. Less accurate nodes are identified by the gradient of a loss function. Loss functions must be differentiable such as a linear or logarithmic functions. The modified node weights in the new tree are selected to minimize the gradient of the loss function. In an example embodiment, a decision tree is implemented to determine user transporting histories and gradient boosting is applied to the tree to improve its ability to accurately determine whether fraud is likely.

Neural Networks

In one example embodiment, Neural Networks are implemented. NNs are a family of statistical learning models influenced by biological neural networks of the brain. NNs can be trained on a relatively-large dataset (e.g., 50,000 or more) and used to estimate, approximate, or predict an output that depends on a large number of inputs/features. NNs can be envisioned as so-called "neuromorphic" systems of interconnected processor elements, or "neurons", and exchange electronic signals, or "messages". Similar to the so-called "plasticity" of synaptic neurotransmitter connections that carry messages between biological neurons, the connections in NNs that carry electronic "messages" between "neurons" are provided with numeric weights that correspond to the strength or weakness of a given connection. The weights can be tuned based on experience, making NNs adaptive to inputs and capable of learning. For example, an NN for user transporting histories is defined by a set of input neurons that can be given input data such as user transporting histories. The input neuron weighs and transforms the input data and passes the result to other neurons, often referred to as "hidden" neurons. This is repeated until an output neuron is activated. The activated output neuron produces a result. In example embodiments, user interaction histories and secondary user actions or data are used to train the neurons in a NN machine learning module, which, after training, is used to estimate whether fraud is likely.

Convolutional Autoencoder

In example embodiments, convolutional autoencoder (CAE) is implemented. A CAE is a type of neural network and comprises, in general, two main components. First, the convolutional operator that filters an input signal to extract features of the signal. Second, an autoencoder that learns a set of signals from an input and reconstructs the signal into an output. By combining these two components, the CAE learns the optimal filters that minimize reconstruction error resulting an improved output. CAEs are trained to only learn filters capable of feature extraction that can be used to reconstruct the input. Generally, convolutional autoencoders implement unsupervised learning. In example embodiments, the convolutional autoencoder is a variational convolutional autoencoder. In example embodiments, features from a user transporting histories are used as an input signal into a CAE which reconstructs that signal into an output such as a whether fraud is likely.

Deep Learning

In example embodiments, deep learning is implemented. Deep learning expands the neural network by including more layers of neurons. A deep learning module is characterized as having three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction. In example embodiments, user transporting histories are used to train the neurons of a deep learning module, which, after training, is used to estimate whether fraud is likely.

Convolutional Neural Network (CNN)

In an example embodiment, a convolutional neural network is implemented. CNNs is a class of NNs further attempting to replicate the biological neural networks, but of the animal visual cortex. CNNs process data with a grid pattern to learn spatial hierarchies of features. Wherein NNs are highly connected, sometimes fully connected, CNNs are connected such that neurons corresponding to neighboring data (e.g., pixels) are connected. This significantly reduces the number of weights and calculations each neuron must perform.

In general, input data, such as user transporting histories, comprises of a multidimensional vector. A CNN, typically, comprises of three layers: convolution, pooling, and fully connected. The convolution and pooling layers extract features and the fully connected layer combines the extracted features into an output, such as whether fraud is likely.

In particular, the convolutional layer comprises of multiple mathematical operations such as of linear operations, a specialized type being a convolution. The convolutional layer calculates the scalar product between the weights and the region connected to the input volume of the neurons. These computations are performed on kernels, which are reduced dimensions of the input vector. The kernels span the entirety of the input. The rectified linear unit (i.e., ReLu) applies an elementwise activation function (e.g., sigmoid function) on the kernels.

CNNs can optimized with hyperparameters. In general, there three hyperparameters are used: depth, stride, and zero-padding. Depth controls the number of neurons within a layer. Reducing the depth may increase the speed of the CNN but may also reduce the accuracy of the CNN. Stride determines the overlap of the neurons. Zero-padding controls the border padding in the input.

The pooling layer down-samples along the spatial dimensionality of the given input (i.e., convolutional layer output), reducing the number of parameters within that activation. As an example, kernels are reduced to dimensionalities of 2×2 with a stride of 2, which scales the activation map down to 25%. The fully connected layer uses inter-layer-connected neurons (i.e., neurons are only connected to neurons in other layers) to score the activations for classification and/or regression. Extracted features may become hierarchically more complex as one layer feeds its output into the next layer. See O'Shea, K.; Nash, R. An Introduction to Convolutional Neural Networks. arXiv 2015 and Yamashita, R., et al Convolutional neural networks: an overview and application in radiology. *Insights Imaging* 9, 611-629 (2018).

Recurrent Neural Network (RNN)

In an example embodiment, a recurrent neural network is implemented. RNNs are class of NNs further attempting to replicate the biological neural networks of the brain. RNNs comprise of delay differential equations on sequential data or time series data to replicate the processes and interactions of the human brain. RNNs have "memory" wherein the RNN can take information from prior inputs to influence the current output. RNNs can process variable length sequences of inputs by using their "memory" or internal state information. Where NNs may assume inputs are independent from the outputs, the outputs of RNNs may be dependent on prior elements with the input sequence. For example, input such as is received by a RNN, which determines whether one or more rules would be useful to identify a likely failure. See Sherstinsky, Alex. "Fundamentals of recurrent neural network (RNN) and long short-term memory (LSTM) network." Physica D: Nonlinear Phenomena 404 (2020): 132306.

Long Short-Term Memory (LSTM)

In an example embodiment, a Long Short-term Memory is implemented. LSTM are a class of RNNs designed to overcome vanishing and exploding gradients. In RNNs, long term dependencies become more difficult to capture because the parameters or weights either do not change with training or fluctuate rapidly. This occurs when the RNN gradient exponentially decreases to zero, resulting in no change to the weights or parameters, or exponentially increases to infinity, resulting in large changes in the weights or parameters. This exponential effect is dependent on the number of layers and multiplicative gradient. LSTM overcomes the vanishing/exploding gradients by implementing "cells" within the hidden layers of the NN. The "cells" comprise three gates: an input gate, an output gate, and a forget gate. The input gate reduces error by controlling relevant inputs to update the current cell state. The output gate reduces error by controlling relevant memory content in the present hidden state. The forget gate reduces error by controlling whether prior cell states are put in "memory" or forgotten. The gates use activation functions to determine whether the data can pass through the gates. While one skilled in the art would recognize the use of any relevant activation function, example activation functions are sigmoid, tanh, and RELU. See Zhu, Xiaodan, et al. "Long short-term memory over recursive structures." International Conference on Machine Learning. PMLR, 2015.

Matrix Factorization

In example embodiments, Matrix Factorization is implemented. Matrix factorization machine learning exploits inherent relationships between two entities drawn out when multiplied together. Generally, the input features are mapped to a matrix F which is multiplied with a matrix R containing the relationship between the features and a predicted outcome. The resulting dot product provides the prediction. The matrix R is constructed by assigning random values throughout the matrix. In this example, two training matrices are assembled. The first matrix X contains training input features and the second matrix Z contains the known output of the training input features. First the dot product of R and X are computed and the square mean error, as one example method, of the result is estimated. The values in R are modulated and the process is repeated in a gradient descent style approach until the error is appropriately minimized. The trained matrix R is then used in the machine learning model. In example embodiments, user transporting histories are used to train the relationship matrix R in a matrix factorization machine learning module. After training, the relationship matrix R and input matrix F, which comprises vector representations of user transporting histories, results in the prediction matrix P comprising whether fraud is likely.

Hidden Markov Model

In example embodiments, a hidden Markov model is implemented. A HMM takes advantage of the statistical Markov model to predict an outcome. A Markov model assumes a Markov process, wherein the probability of an outcome is solely dependent on the previous event. In the case of HMM, it is assumed an unknown or "hidden" state is dependent on some observable event. A HMM comprises a network of connected nodes. Traversing the network is dependent on three model parameters: start probability; state transition probabilities; and observation probability. The start probability is a variable that governs, from the input node, the most plausible consecutive state. From there each node i has a state transition probability to node j. Typically the state transition probabilities are stored in a matrix $M_{ij}$ wherein the sum of the rows, representing the probability of state i transitioning to state j, equals 1. The observation probability is a variable containing the probability of output o occurring. These too are typically stored in a matrix $N_{oj}$ wherein the probability of output o is dependent on state j. To build the model parameters and train the HMM, the state and output probabilities are computed. This can be accomplished with, for example, an inductive algorithm. Next, the state sequences are ranked on probability, which can be accomplished, for example, with the Viterbi algorithm. Finally, the model parameters are modulated to maximize the probability of a certain sequence of observations. This is typically accomplished with an iterative process wherein the neighborhood of states is explored, the probabilities of the state sequences are measured, and model parameters updated to increase the probabilities of the state sequences. In example embodiments, user transporting histories are used to train the nodes/states of the HMM machine learning module, which, after training, is used to estimate whether one or more rules would be useful to identify a likely failure.

Support Vector Machine

In example embodiments, support vector machines are implemented. SVMs separate data into classes defined by n-dimensional hyperplanes (n-hyperplane) and are used in both regression and classification problems. Hyperplanes are decision boundaries developed during the training process of a SVM. The dimensionality of a hyperplane depends on the number of input features. For example, a SVM with two input features will have a linear (1-dimensional) hyperplane while a SVM with three input features will have a planer (2-dimensional) hyperplane. A hyperplane is optimized to have the largest margin or spatial distance from the nearest data point for each data type. In the case of simple linear regression and classification a linear equation is used to develop the hyperplane. However, when the features are more complex a kernel is used to describe the hyperplane. A kernel is a function that transforms the input features into higher dimensional space. Kernel functions can be linear, polynomial, a radial distribution function (or gaussian radial distribution function), or sigmoidal. In example embodiments, user transporting histories are used to train the linear equation or kernel function of the SVM machine learning module, which, after training, is used to estimate whether one or more rules would be useful to identify a likely failure.

K-Means Clustering

In one example embodiment, K-means clustering is implemented. KMC assumes data points have implicit shared characteristics and "clusters" data within a centroid or "mean" of the clustered data points. During training, KMC adds a number of k centroids and optimizes its position around clusters. This process is iterative, where each centroid, initially positioned at random, is re-positioned towards the average point of a cluster. This process concludes when the centroids have reached an optimal position within a cluster. Training of a KMC module is typically unsupervised. In example embodiments, user transporting histories are used to train the centroids of a KMC machine learning module, which, after training, is used to estimate whether fraud is likely.

K-Nearest Neighbor

In one example embodiment, K-nearest neighbor is implemented. On a general level, KNN shares similar characteristics to KMC. For example, KNN assumes data points near each other share similar characteristics and computes the distance between data points to identify those similar characteristics but instead of k centroids, KNN uses k number of neighbors. The k in KNN represents how many neighbors will assign a data point to a class, for classification, or object property value, for regression. Selection of an appropriate number of k is integral to the accuracy of KNN. For example, a large k may reduce random error associated with variance in the data but increase error by ignoring small but significant differences in the data. Therefore, a careful choice of k is selected to balance overfitting and underfitting. Concluding whether some data point belongs to some class or property value k, the distance between neighbors is computed. Common methods to compute this distance are Euclidean, Manhattan or Hamming to name a few. In some embodiments, neighbors are given weights depending on the neighbor distance to scale the similarity between neighbors to reduce the error of edge neighbors of one class "outvoting" near neighbors of another class. In one example embodiment, k is 1 and a Markov model approach is utilized. In example embodiments, user transporting histories are used to train a KNN machine learning module, which, after training, is used to estimate a failure is likely.

To perform one or more of its functionalities, the machine learning module may communicate with one or more other systems. For example, an integration system may integrate the machine learning module with one or more email servers, web servers, one or more databases, or other servers, systems, or repositories. In addition, one or more functionalities may require communication between a user and the machine learning module.

Any one or more of the modules described herein may be implemented using hardware (e.g., one or more processors of a computer/machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, to allow information to be passed between the applications so as to allow the applications to share and access common data.

Multimodal Translation

In an example embodiment, the machine learning module comprises multimodal translation (MT), also known as multimodal machine translation or multimodal neural machine translation. MT comprises of a machine learning module capable of receiving multiple (e.g. two or more) modalities. Typically, the multiple modalities comprise of information connected to each other.

In example embodiments, the MT may comprise of a machine learning method further described herein. In an example embodiment, the MT comprises a neural network, deep neural network, convolutional neural network, convolutional autoencoder, recurrent neural network, or an LSTM. For example, one or more microscopy imaging data comprising multiple modalities from a subject is embedded as further described herein. The embedded data is then received by the machine learning module. The machine learning module processes the embedded data (e.g. encoding and decoding) through the multiple layers of architecture then determines the corresponding the modalities comprising the input. The machine learning methods further described herein may be engineered for MT wherein the inputs described herein comprise of multiple modalities. See e.g. Sulubacak, U., Caglayan, O., Grönroos, S A. et al. Multimodal machine translation through visuals and speech. Machine Translation 34, 97-147 (2020) and Huang, Xun, et al. "Multimodal unsupervised image-to-image translation." Proceedings of the European conference on computer vision (ECCV). 2018.

The ladder diagrams, scenarios, flowcharts and block diagrams in the figures and discussed herein illustrate architecture, functionality, and operation of example embodiments and various aspects of systems, methods, and computer program products of the present invention. Each block in the flowchart or block diagrams can represent the processing of information and/or transmission of information corresponding to circuitry that can be configured to execute the logical functions of the present techniques. Each block in the flowchart or block diagrams can represent a module, segment, or portion of one or more executable instructions for implementing the specified operation or step. In example embodiments, the functions/acts in a block can occur out of the order shown in the figures and nothing requires that the operations be performed in the order illustrated. For example, two blocks shown in succession can executed concurrently or essentially concurrently. In another example, blocks can be executed in the reverse order. Furthermore, variations, modifications, substitutions, additions, or reduction in blocks and/or functions may be used with any of the ladder diagrams, scenarios, flow charts and block diagrams discussed herein, all of which are explicitly contemplated herein.

The ladder diagrams, scenarios, flow charts and block diagrams may be combined with one another, in part or in whole. Coordination will depend upon the required functionality. Each block of the block diagrams and/or flowchart illustration as well as combinations of blocks in the block diagrams and/or flowchart illustrations can be implemented by special purpose hardware-based systems that perform the aforementioned functions/acts or carry out combinations of special purpose hardware and computer instructions. Moreover, a block may represent one or more information transmissions and may correspond to information transmissions among software and/or hardware modules in the same physical device and/or hardware modules in different physical devices.

The present techniques can be implemented as a system, a method, a computer program product, digital electronic circuitry, and/or in computer hardware, firmware, software, or in combinations of them. The system may comprise distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors.

FIG. 3 depicts a block diagram of a computing machine 2000 and a module 2050 in accordance with certain examples. The computing machine 2000 may comprise, but is not limited to, remote devices, work stations, servers, computers, general purpose computers, Internet/web appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and any machine capable of executing the instructions. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The one or more embodiments of processor 2010 may be configured to execute code or instructions to perform the operations and functionality described herein, manage request flow and address mappings, and to perform calculations and generate commands. Such code or instructions could include, but is not limited to, firmware, resident software, microcode, and the like. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), tensor processing units (TPUs), a graphics processing unit ("GPU"), a field programmable gate array ("FPGA"), a programmable logic device ("PLD"), a radio-frequency integrated circuit (RFIC), a controller, a state machine, gated logic, discrete hardware components, any other processing unit, or any combination or multiplicity thereof. In example embodiments, each processor 2010 can include a reduced instruction set computer (RISC) microprocessor. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines. Processors 2010 are coupled to system memory and various other components via a system bus 2020.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random-access memory ("RAM"), static random-access memory ("SRAM"), dynamic random-access memory ("DRAM"), and synchronous dynamic random-access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 is coupled to system bus 2020 and can include a basic input/output system (BIOS), which controls certain basic functions of the processor 2010 and/or operate in conjunction with, a non-volatile storage device such as the storage media 2040.

In example embodiments, the computing device 2000 includes a graphics processing unit (GPU) (not shown). Graphics processing unit is a specialized electronic circuit designed to manipulate and alter memory to accelerate the creation of images in a frame buffer intended for output to a display. In general, a graphics processing unit is efficient at manipulating computer graphics and image processing and has a highly parallel structure that makes it more effective than general-purpose CPUs for algorithms where processing of large blocks of data is done in parallel.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any electromagnetic storage device, any semiconductor storage device, any physical-based storage device, any removable and non-removable media, any other data storage device, or any combination or multiplicity thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The module 2050 may comprise one or more hardware or software elements, as well as an operating system, configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. Each of the operating system, one or more application programs, other program modules, and program data or some combination thereof, may include an implementation of a networking environment. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for coupling in operation the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including cursor control devices, touch-screens, scanners, electronic digitizers, sensors, receivers, touchpads, trackballs, cameras, microphones, alphanumeric input devices, any other pointing devices, or any combinations thereof. The I/O interface 2060 may couple the computing machine 2000 to various output devices including video displays (The computing device 2000 may further include a graphics display, for example, a plasma display panel (PDP), a light emitting diode (LED) display, a liquid crystal display (LCD), a projector, a cathode ray tube (CRT), or any other display capable of displaying graphics or video), audio generation device, printers, projectors, tactile feedback devices, automation control, robotic components, actuators, motors, fans, solenoids, valves, pumps, transmitters, signal emitters, lights, and so forth. The I/O interface 2060 may couple the computing device 2000 to various devices capable of input and out, such as a storage unit. The devices can be interconnected to the system bus 2020 via a user interface adapter, which can include, for example, a Super I/O chip integrating multiple device adapters into a single integrated circuit.

The computing machine 2000 may operate in a networked environment using logical connections through the network interface 2070 to one or more other systems or computing machines across the network 2080. The network 2080 may include a local area network ("LAN"), a wide area network ("WAN"), an intranet, an Internet, a mobile telephone network, storage area network ("SAN"), personal area network ("PAN"), a metropolitan area network ("MAN"), a wireless network ("WiFi;"), wireless access networks, a wireless local area network ("WLAN"), a virtual private network ("VPN"), a cellular or other mobile communication network, Bluetooth, near field communication ("NFC"), ultra-wideband, wired networks, telephone networks, optical networks, copper transmission cables, or combinations thereof or any other appropriate architecture or system that facilitates the communication of signals and data. The network 2080 may be packet switched, circuit switched, of any topology, and may use any communication protocol. The network 2080 may comprise routers, firewalls, switches, gateway computers and/or edge servers. Communication links within the network 2080 may involve various digital or analog communication media such as fiber optic cables, free-space optics, waveguides, electrical conductors, wireless links, antennas, radio-frequency communications, and so forth.

Information for facilitating reliable communications can be provided, for example, as packet/message sequencing information, encapsulation headers and/or footers, size/time information, and transmission verification information such as cyclic redundancy check (CRC) and/or parity check values. Communications can be made encoded/encrypted, or otherwise made secure, and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure and then decrypt/decode communications.

The processor 2010 may be connected to the other elements of the computing machine 2000 or the various peripherals discussed herein through the system bus 2020. The system bus 2020 represents one or more of any of several types of bus structures, including a memory bus or memory controller, a peripheral bus, an accelerated graphics port, and a processor or local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. It should be appreciated that the system bus 2020 may be within processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those ordinarily skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

A "server" may comprise a physical data processing system (for example, the computing device 2000 as shown in FIG. 3) running a server program. A physical server may or may not include a display and keyboard. A physical server may be connected, for example by a network, to other computing devices. Servers connected via a network may operate in the capacity of a server machine or a client machine in a server-client network environment, or as a peer machine in a distributed (e.g., peer-to-peer) network environment. The computing device 2000 can include clients' servers. For example, a client and server can be remote from each other and interact through a network. The relationship of client and server arises by virtue of computer programs in communication with each other, running on the respective computers.

The example systems, methods, and acts described in the examples and described in the figures presented previously are illustrative, not intended to be exhaustive, and not meant to be limiting. In alternative examples, certain acts can be performed in a different order, in parallel with one another, omitted entirely, and/or combined between different examples, and/or certain additional acts can be performed, without departing from the scope and spirit of various examples. Plural instances may implement components, operations, or structures described as a single instance. Structures and functionality that may appear as separate in example embodiments may be implemented as a combined structure or component. Similarly, structures and functionality that may appear as a single component may be implemented as separate components. Accordingly, such alternative examples are included in the scope of the following claims, which are to be accorded the broadest interpretation to encompass such alternate examples. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

one or more processors communicatively coupled to a storage device, wherein the one or more processors execute instructions that are stored in the storage device to cause the system to:

receive a request for a single-use token, wherein the request comprises a token type associated with the single-use token and request metadata associated with the request;

determine, based on the token type of the single-use token, a plurality of computing devices for receiving the single-use token and a plurality of sets of parameters that each computing device of the plurality of computing devices is to access;

identify a plurality of encryption keys associated with the plurality of computing devices;

encrypt, for each computing device of the plurality of computing devices, a first set of parameters of the plurality of sets of parameters using a first encryption key corresponding to a first computing device of the plurality of computing devices and a second set of parameters of the plurality of sets of parameters using a second encryption key corresponding to a second computing device of the plurality of computing devices to generate a first encrypted set of parameters and a second encrypted set of parameters, wherein each computing device of the plurality of computing devices, including the first computing device and the second computing device, stores a corresponding distinct decryption key for decrypting a corresponding set of parameters, and wherein each computing device of the plurality of computing devices, including the first computing device and the second computing device, decrypts and accesses its associated set of parameters using the corresponding distinct decryption key;

generate the single-use token by adding the first encrypted set of parameters and the second encrypted set of parameters to the single-use token;

generate token metadata for each computing device of the plurality of computing devices, wherein the token metadata comprises one or more indications within the single-use token for each computing device of the plurality of computing devices;

store the token metadata in a data structure within the single-use token, wherein each computing device of the plurality of computing devices accesses the data structure and determines a corresponding portion of the single-use token to decrypt, the corresponding portion comprising at least the first encrypted set of parameters or the second encrypted set of parameters; and transmit the single-use token to a requesting device.

2. The system of claim 1, wherein the instructions for determining the plurality of computing devices for receiving the single-use token and the plurality of sets of parameters that each computing device is to access further cause the one or more processors to:

retrieve token type metadata associated with the token type, wherein the token type metadata indicates computing device types for the request; and identify, within the request, the plurality of computing devices based on corresponding computing device types.

3. The system of claim 1, wherein the instructions for encrypting the first set of parameters and the second set of parameters further cause the one or more processors to:

determine, based on computing system types of the first computing device and the second computing device, the first set of parameters required by the first computing device and the second set of parameters required by the second computing device.

4. The system of claim 1, wherein the instructions further cause the one or more processors to:

determine that the request is associated with a first token type;

based on determining that the request is associated with the first token type, retrieve a plurality of user parameters and a plurality of object parameters;

encrypt the plurality of object parameters with the first encryption key associated with the first computing device of the plurality of computing devices for processing object data to generate encrypted object data;

encrypt the plurality of user parameters with the second encryption key associated with the second computing device of the plurality of computing devices for processing user data to generate encrypted user data; and add the encrypted user data and the encrypted object data to the single-use token.

5. The system of claim 1, wherein the instructions further cause the one or more processors to:

determine a set of parameters required for the first computing device;

overwrite, within the single-use token, token parameters that are not within the set of parameters to generate a new token; and transmit the new token to the first computing device.

6. The system of claim 1, wherein the single-use token comprises a plurality of distinct data portions, each of the distinct data portions includes an encrypted set of parameters that corresponds to a different computing device of the plurality of computing devices.

7. A method, comprising:

receiving a request for an access token, wherein the request comprises a token type associated with the access token and request metadata associated with the request;

determining, based on the token type of the access token, a plurality of computing devices for receiving the access token and a plurality of sets of parameters that each computing device of the plurality of computing devices is to access;

identifying a plurality of encryption keys associated with the plurality of computing devices;

encrypting, for each computing device of the plurality of computing devices, a first set of parameters of the plurality of sets of parameters using a first encryption key corresponding to a first computing device of the plurality of computing devices and a second set of parameters of the plurality of sets of parameters using a second encryption key corresponding to a second computing device of the plurality of computing devices to generate a first encrypted set of parameters and a second encrypted set of parameters, wherein each computing device of the plurality of computing devices, including the first computing device and the second computing device, stores a corresponding distinct decryption key for decrypting a corresponding set of parameters, and wherein each computing device of the plurality of computing devices, including the first computing device and the second computing device, decrypts and accesses its associated set of parameters using the corresponding distinct decryption key;

generating the access token by adding the first encrypted set of parameters and the second encrypted set of parameters to the access token;

generating token metadata for each computing device of the plurality of computing devices, wherein the token metadata comprises one or more indications within the access token for each computing device of the plurality of computing devices;

storing the token metadata in a data structure within the access token, wherein each computing device of the plurality of computing devices accesses the data structure and determines a corresponding portion of the access token to decrypt, the corresponding portion comprising at least the first encrypted set of parameters or the second encrypted set of parameters; and transmitting the access token to a requesting device.

8. The method of claim 7, wherein determining the plurality of computing devices for receiving the access token and the plurality of sets of parameters that each computing device is to access comprises:

retrieving token type metadata associated with the token type, wherein the token type metadata indicates computing device types for the request; and identifying, within the request, the plurality of computing devices based on corresponding computing device types.

9. The method of claim 7, wherein encrypting the first set of parameters and the second set of parameters further comprises:

determining, based on computing system types of the first computing device and the second computing device, the first set of parameters required by the first computing device and the second set of parameters required by the second computing device.

10. The method of claim 7, further comprising:

determining that the request is associated with a first token type;

based on determining that the request is associated with the first token type, retrieving a plurality of user parameters and a plurality of object parameters;

encrypting the plurality of object parameters with the first encryption key associated with the first computing device of the plurality of computing devices for processing object data to generate encrypted object data;

encrypting the plurality of user parameters with the second encryption key associated with the second computing device of the plurality of computing devices for processing user data to generate encrypted user data; and adding the encrypted user data and the encrypted object data to the access token.

11. The method of claim 7, further comprising:

determining a set of parameters required for the first computing device;

overwriting, within the access token, token parameters that are not within the set of parameters to generate a new token; and transmitting the new token to the first computing device.

12. The method of claim 7, wherein the access token is a single-use token.

13. One or more non-transitory, computer-readable storage media storing instructions that when executed by one or more processors cause the one or more processors to:

receive a request for an access token, wherein the request comprises a token type associated with the access token and request metadata associated with the request;

determine, based on the token type of the access token, a plurality of computing devices for receiving the access token and a plurality of sets of parameters that each computing device of the plurality of computing devices is to access;

identify a plurality of encryption keys associated with the plurality of computing devices;

encrypt, for each computing device of the plurality of computing devices, a first set of parameters of the plurality of sets of parameters using a first encryption key corresponding to a first computing device of the plurality of computing devices and a second set of parameters of the plurality of sets of parameters using a second encryption key corresponding to a second computing device of the plurality of computing devices to generate a first encrypted set of parameters and a second encrypted set of parameters, wherein each computing device of the plurality of computing devices, including the first computing device and the second computing device, stores a corresponding distinct decryption key for decrypting a corresponding set of parameters, and wherein each computing device of the plurality of computing devices, including the first computing device and the second computing device, decrypts and accesses its associated set of parameters using the corresponding distinct decryption key;

generate the access token by adding the first encrypted set of parameters and the second encrypted set of parameters to the access token;

generate token metadata for each computing device of the plurality of computing devices, wherein the token metadata comprises one or more indications within the access token for each computing device of the plurality of computing devices;

store the token metadata in a data structure within the access token, wherein each computing device of the plurality of computing devices accesses the data structure and determines a corresponding portion of the access token to decrypt, the corresponding portion comprising at least the first encrypted set of parameters or the second encrypted set of parameters; and transmit the access token to a requesting device.

14. The one or more non-transitory, computer-readable storage media of claim 13, wherein the instructions for determining the plurality of computing devices for receiving the access token and the plurality of sets of parameters that each computing device is to access further cause the one or more processors to:

retrieve token type metadata associated with the token type, wherein the token type metadata indicates computing device types for the request; and identify, within the request, the plurality of computing devices based on corresponding computing device types.

15. The one or more non-transitory, computer-readable storage media of claim 13, wherein the instructions for encrypting the first set of parameters and the second set of parameters further cause the one or more processors to:

determine, based on computing system types of the first computing device and the second computing device, the first set of parameters required by the first computing device and the second set of parameters required by the second computing device.

16. The one or more non-transitory, computer-readable storage media of claim 13, wherein the instructions further cause the one or more processors to:

determine that the request is associated with a first token type;

based on determining that the request is associated with the first token type, retrieve a plurality of user parameters and a plurality of object parameters;

encrypt the plurality of object parameters with the first encryption key associated with the first computing device of the plurality of computing devices for processing object data to generate encrypted object data;

encrypt the plurality of user parameters with the second encryption key associated with the second computing device of the plurality of computing devices for processing user data to generate encrypted user data; and add the encrypted user data and the encrypted object data to the access token.

17. The one or more non-transitory, computer-readable storage media of claim 13, wherein the instructions further cause the one or more processors to:

determine a set of parameters required for the first computing device;

overwrite, within the access token, token parameters that are not within the set of parameters to generate a new token; and transmit the new token to the first computing device.

18. The one or more non-transitory, computer-readable storage media of claim 13, wherein the access token is a single-use token.

\* \* \* \* \*